(12) United States Patent
Sato et al.

(10) Patent No.: US 8,557,424 B2
(45) Date of Patent: Oct. 15, 2013

(54) SECONDARY BATTERY

(75) Inventors: Hiroaki Sato, Kanagawa (JP); Yoichi Miyajima, Tokyo (JP); Shoichi Shintani, Saitama (JP); Toshio Takeshita, Kanagawa (JP); Atsushi Takahashi, Aichi (JP); Kei Tashiro, Kanagawa (JP); Hideki Kamiya, Aichi (JP); Hisashi Aoki, Aichi (JP); Osamu Nagashima, Tokyo (JP)

(73) Assignee: Sony Corporation, Tokyo (JP)

(*) Notice: Subject to any disclaimer, the term of this patent is extended or adjusted under 35 U.S.C. 154(b) by 984 days.

(21) Appl. No.: 11/495,658

(22) Filed: Jul. 31, 2006

(65) Prior Publication Data
US 2007/0037044 A1    Feb. 15, 2007

(30) Foreign Application Priority Data

Aug. 12, 2005   (JP) .................................. 2005-234937

(51) Int. Cl.
*H01M 2/10*   (2006.01)
*H01M 2/08*   (2006.01)
*H01M 2/04*   (2006.01)
*H01M 2/02*   (2006.01)

(52) U.S. Cl.
USPC ............... 429/96; 429/97; 429/100; 429/175; 429/176; 429/178; 429/185; 429/186

(58) Field of Classification Search
USPC ............... 429/96, 97, 123, 1, 53, 7, 162, 163, 429/100, 175, 176, 178, 185, 186; 607/5; 348/373; 310/47; 708/173; 29/623.1, 29/623.4

See application file for complete search history.

(56) References Cited

U.S. PATENT DOCUMENTS 3,338,452 A * 8/1967 Oakley et al. ................. 220/23.4
5,191,276 A * 3/1993 Zainaleain ..................... 320/110

(Continued)

FOREIGN PATENT DOCUMENTS

DE    29601560 U1 * 6/1996
JP    10-340710      12/1998

(Continued)

OTHER PUBLICATIONS

"Electronics and Electical Tapes", Tapes II International, 2909 W Pendleton Ave, Santa Ana, CA. 2003.*

(Continued)

*Primary Examiner* — Kenneth Douyette
(74) *Attorney, Agent, or Firm* — Oblon, Spivak, McClelland, Maier & Neustadt, L.L.P.

(57) ABSTRACT

A secondary battery for an electronic appliance, including a battery cell. The battery cell has a positive electrode, a negative electrode, and an electrolyte in a pack. A positive electrode terminal and a negative electrode terminal are lead out from the same side face of the pack. A metallic battery can accommodates the battery cell therein such that the side face from which the positive electrode terminal and the negative electrode terminal are lead out is faced towards the opening side. A lid, made of a synthetic resin, in which terminal parts to be connected to the electrodes of the electronic appliance upon being connected to the positive electrode terminal and the negative electrode terminal are faced outwardly, plugs the opening of the battery can, the battery cell being accommodated in the battery can upon being adhered onto an inner face thereof.

19 Claims, 24 Drawing Sheets

(56) References Cited

U.S. PATENT DOCUMENTS

| | | | |
|---|---|---|---|
| 5,298,821 A * | 3/1994 | Michel | 310/47 |
| 5,331,580 A * | 7/1994 | Miller et al. | 708/173 |
| 5,341,171 A * | 8/1994 | Mori et al. | 348/373 |
| 5,437,938 A * | 8/1995 | Mitsui et al. | 429/1 |
| 5,741,305 A * | 4/1998 | Vincent et al. | 607/5 |
| 5,895,731 A * | 4/1999 | Clingempeel | 429/162 |
| 6,040,082 A * | 3/2000 | Haas et al. | 429/163 |
| 6,232,013 B1 * | 5/2001 | Clarke et al. | 429/100 |
| 6,410,185 B1 * | 6/2002 | Takahashi et al. | 429/163 |
| 6,924,059 B1 * | 8/2005 | Kawakami et al. | 429/162 |
| 2001/0051298 A1 * | 12/2001 | Hanafusa et al. | 429/162 |
| 2002/0025455 A1 * | 2/2002 | Yoneyama | 429/1 |
| 2003/0082441 A1 * | 5/2003 | Hovi et al. | 429/123 |
| 2003/0180582 A1 * | 9/2003 | Masumoto et al. | 429/7 |
| 2004/0029000 A1 * | 2/2004 | Morita et al. | 429/162 |
| 2004/0131922 A1 * | 7/2004 | Anglin et al. | 429/53 |
| 2004/0197647 A1 * | 10/2004 | Murashige et al. | 429/185 |
| 2005/0017678 A1 * | 1/2005 | Hiratsuka et al. | 320/112 |
| 2005/0142439 A1 * | 6/2005 | Lee et al. | 429/163 |
| 2005/0164080 A1 * | 7/2005 | Kozu et al. | 429/176 |

FOREIGN PATENT DOCUMENTS

| | | |
|---|---|---|
| JP | 2001-313012 | 11/2001 |
| JP | 2002-008606 | 1/2002 |
| JP | 2003-068259 | 3/2003 |
| JP | 2003-217538 | 7/2003 |
| JP | 2003-303580 | 10/2003 |
| JP | 2004-031027 | 1/2004 |
| JP | 2004/111219 A * | 4/2004 |
| JP | 2004-165134 | 6/2004 |
| JP | 2004-327176 | 11/2004 |
| JP | 2005-019242 | 1/2005 |
| JP | 2005-197218 | 7/2005 |

OTHER PUBLICATIONS

English Abstract of: DE-29,601,560 U1, Jaroslav, Bech, Jun. 11, 1996.*

"Nylon Velcro", Mistry Engineering Works, P1, 2011. Retrieved online on Sep. 1, 2011 from: http://www.mistryenggworks.com/nylon-velcro.htm.*

Machine Translation of: JP 2004/111219A, Abe et al., Apr. 8, 2004.*

U.S. Appl. No. 11/495,741, filed Jul. 31, 2006, Takeshita, et al.
U.S. Appl. No. 11/495,719, filed Jul. 31, 2006, Takeshita, et al.
U.S. Appl. No. 11/499,728, filed Aug. 7, 2006, Takahashi, et al.
U.S. Appl. No. 12/827,764, filed Jun. 30, 2010, Takahashi, et al.
U.S. Appl. No. 12/845,443, filed Jul. 28, 2010, Takeshita, et al.
U.S. Appl. No. 12/845,437, filed Jul. 28, 2010, Takeshita, et al.
Office Action issued Jan. 31, 2012, in Japanese Patent Application No. 2005-234937.

* cited by examiner

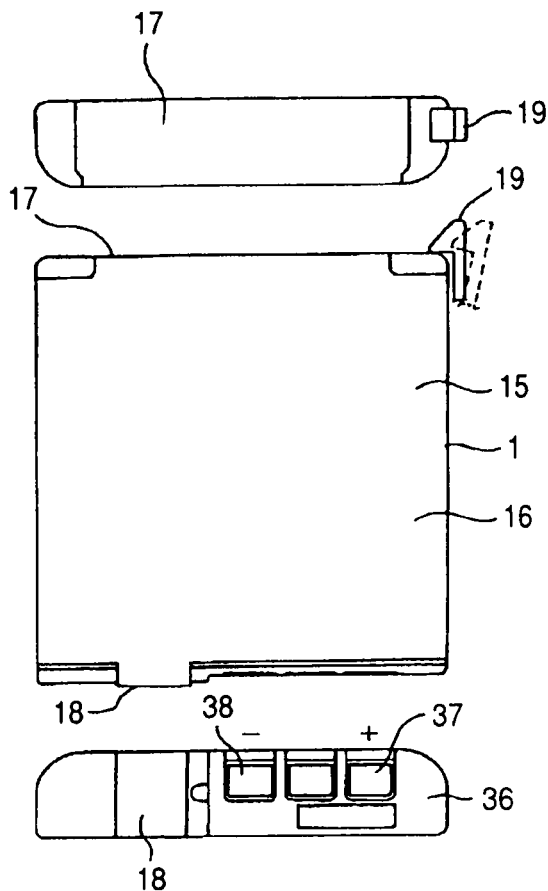
FIG. 9A
FIG. 9B
FIG. 9C
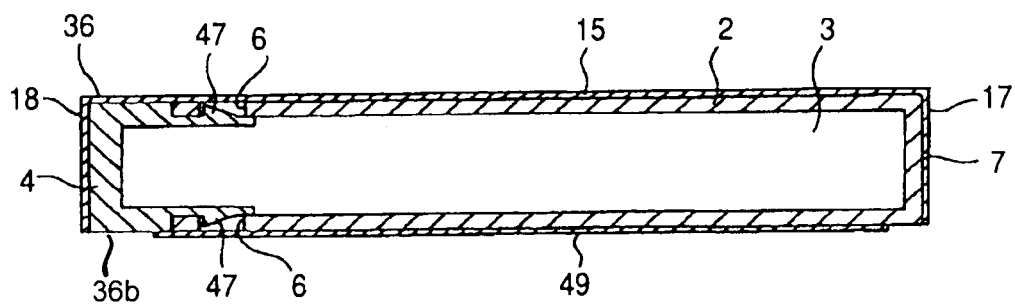
FIG. 10

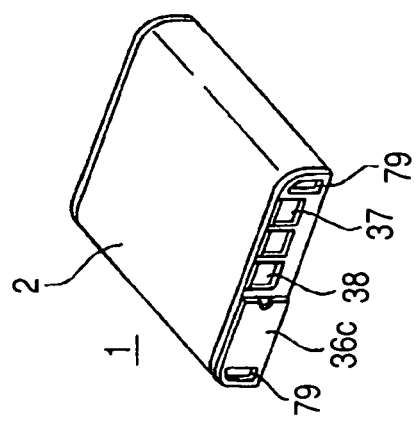
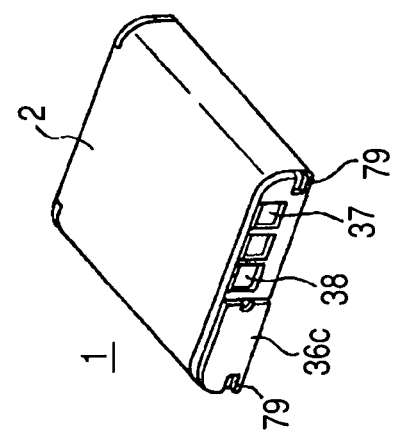
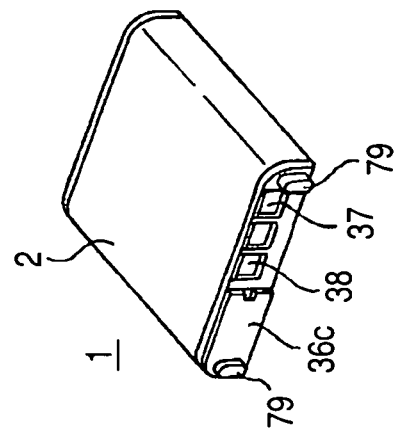

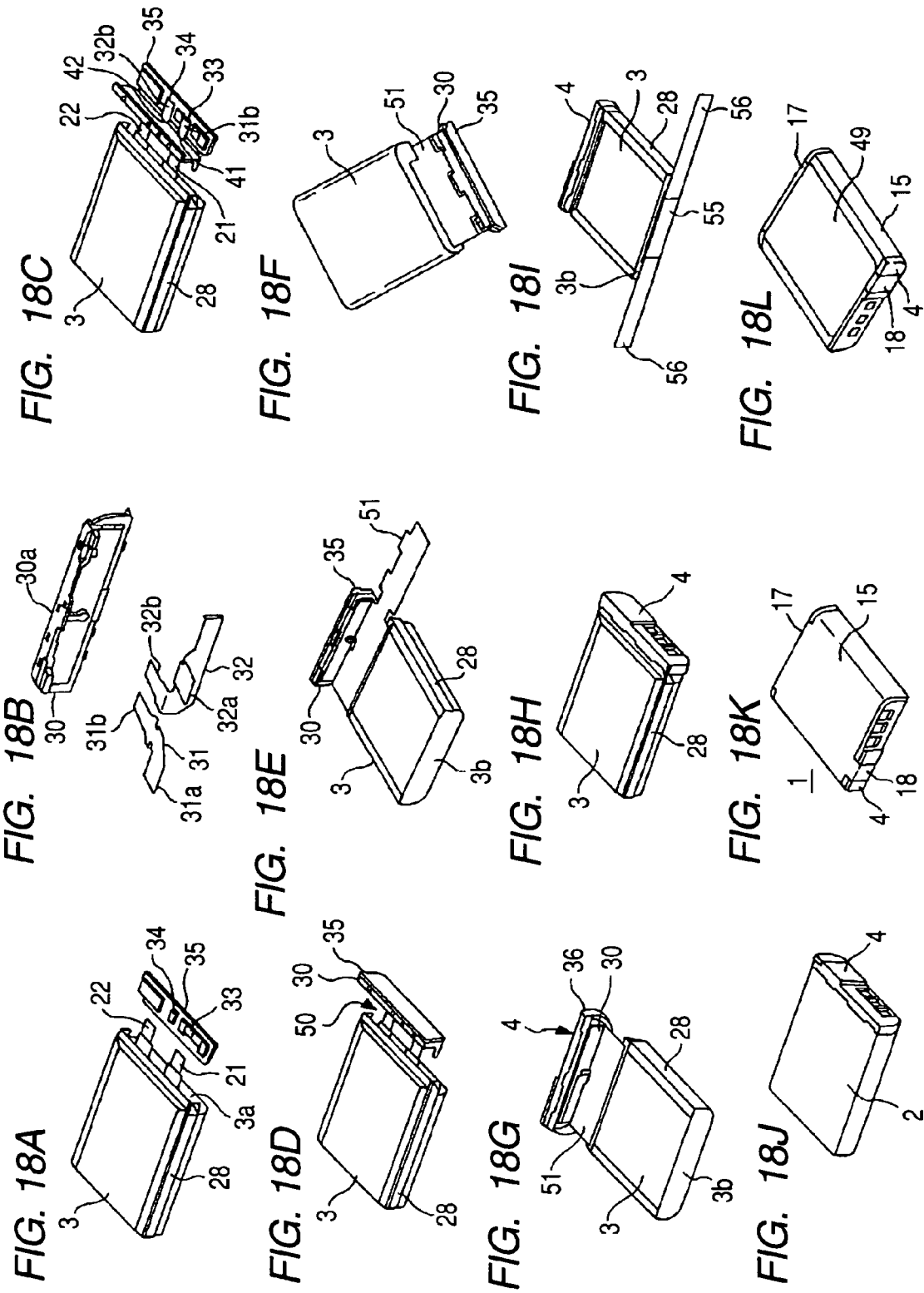

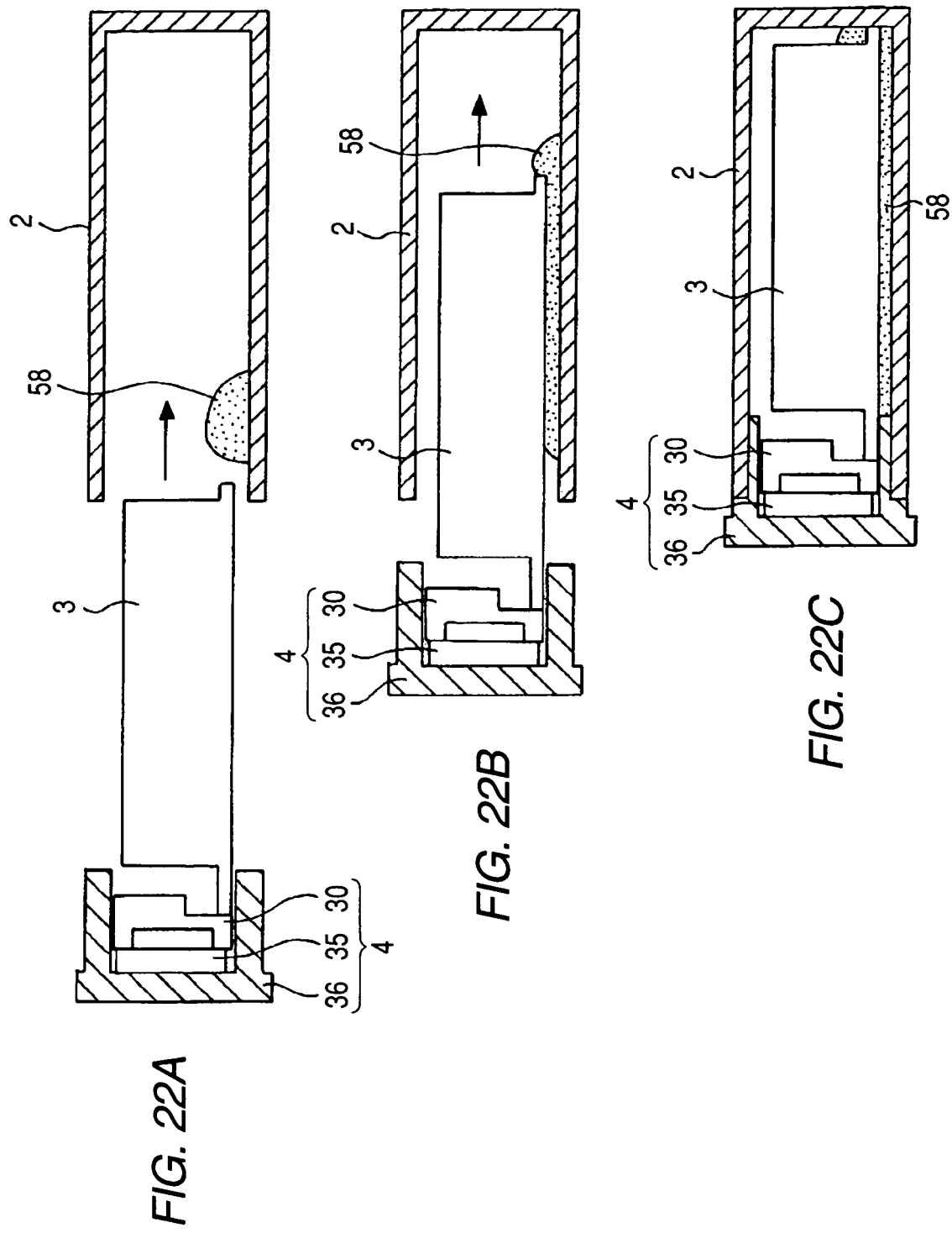

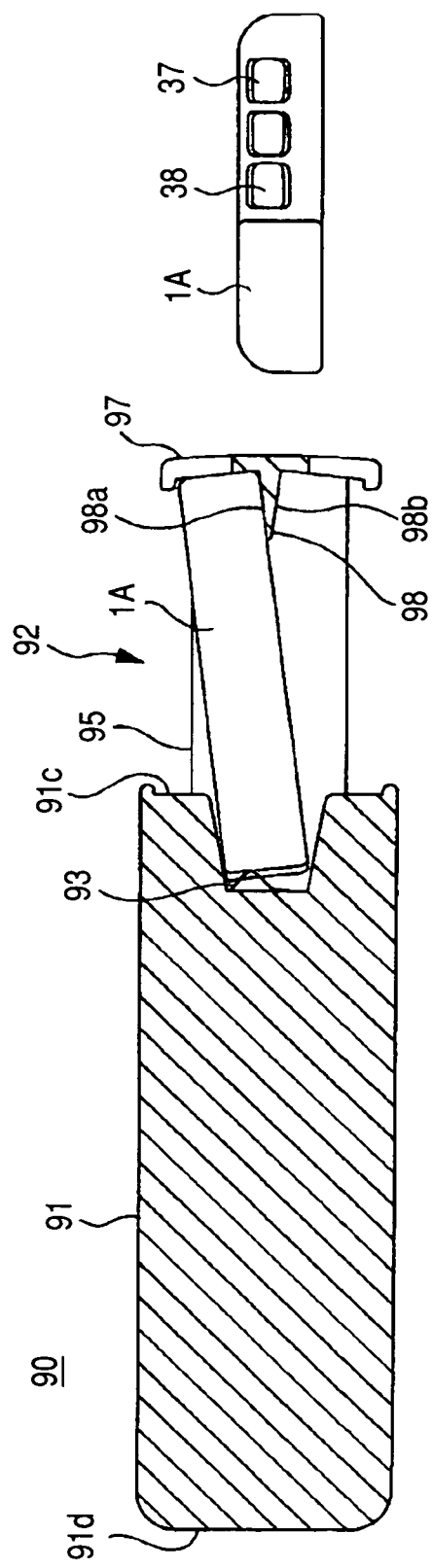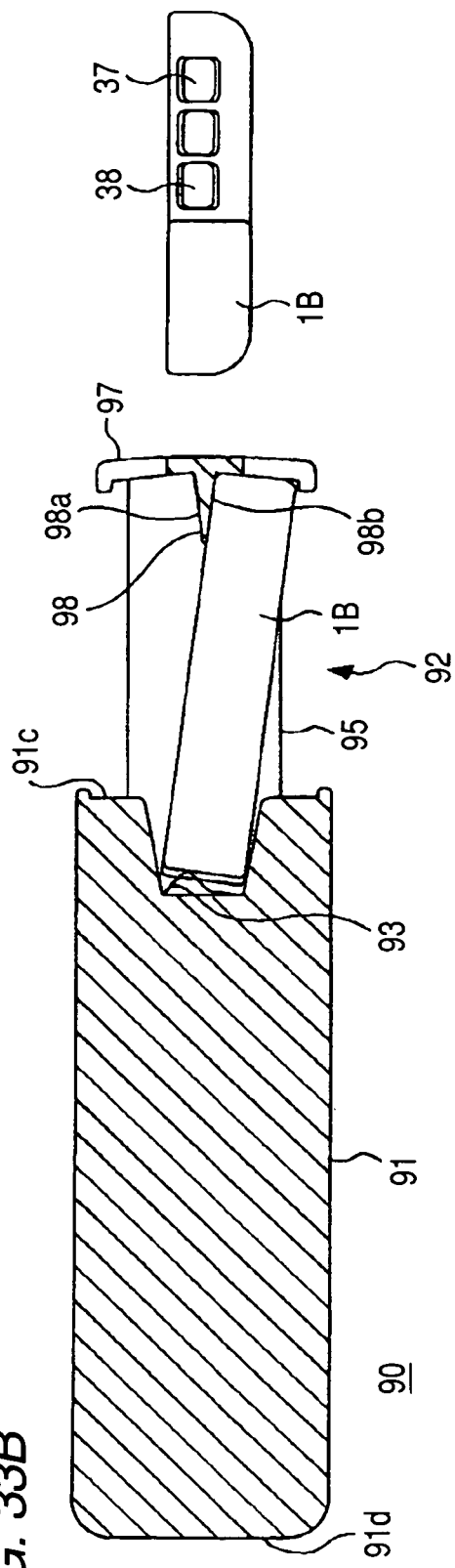
FIG. 33A
FIG. 33B

SECONDARY BATTERY

CROSS REFERENCES TO RELATED APPLICATIONS

The present invention contains subjects related to Japanese Patent Application JP 2005-234937 filed in the Japan Patent Office on Aug. 12, 2005, the entire contents of which being incorporated herein by reference.

BACKGROUND OF THE INVENTION

1. Field of the Invention

The invention relates to a secondary battery having an electrode body as a generating element which is accommodated in a pack, from which electric power as generated by the electrode body is taken out through a pair of positive and negative electrode terminals, such as lithium ion secondary batteries and lithium polymer secondary batteries.

2. Description of the Related Art

In recent years, the demand for portable electronic appliances including information appliances such as notebook personal computers, mobile communication instruments such as mobile telephones, and video cameras is increasing rapidly. Sealed small-sized secondary batteries such as nickel-cadmium batteries, nickel hydrogen batteries, and lithium ion batteries are frequently used as a power source of such an electronic appliance. Above all, lithium ion secondary batteries are employed in various fields while making the most of characteristics such as high voltage, high energy density and lightweight.

In particular, as a countermeasure to the liquid leakage which is problematic in the case of using a liquid based electrolytic solution, for example, there is proposed a so-called polymer lithium ion secondary battery using, as an electrolyte, a gel-like polymer film having a polymer impregnated with a non-aqueous electrolytic solution or by using an electrolyte in a fully solid state.

Such a polymer lithium ion secondary battery is being further developed for the purpose of meeting the demands for respective electronic appliances in recent years, such as downsizing, lightweight and slimming, while making the most of a characteristic that a degree of freedom of the battery shape is high in addition to the characteristics of a battery such as high energy density and lightweight.

Usually, in such a battery, for example, as illustrated in FIG. 37, a single cell 301 made of a laminate of battery elements is accommodated together with a connecting substrate 302 provided with a protective circuit and terminals in a pair of upper and lower plastic cases 303, 304, thereby forming a battery pack 300 (see, for example, Patent Document 1). Joining of the plastic cases 303, 304 having the single cell 301 accommodated therein is usually carried out by ultrasonic welding.

Here, in order to ensure mechanical strengths against falling, vibration or the like, the battery pack 300, an exterior of which is configured by the plastic cases 303, 304, is required to be formed so as to have a considerable thickness, and therefore, it was difficult to devise to achieve downsizing or slimming of the battery pack 300 itself.

Patent Document 1: JP-A-2002-8606

SUMMARY OF THE INVENTION

According to an embodiment of the invention, there is provided a secondary battery which makes the most of advantages of a secondary battery represented by polymer lithium ion secondary batteries and which is able to appropriately meet the demands for electronic appliances in recent years such as downsizing, lightweight and slimming.

In order to solve the foregoing problems, according to an embodiment of the invention, there is provided a secondary battery for electronic appliance to be installed in an electronic appliance, thereby feeding an electric power to the electronic appliance, the secondary battery being provided with a battery cell in which a positive electrode, a negative electrode and an electrolyte are accommodated in a pack, and a positive electrode terminal and a negative electrode terminal from the positive electrode and the negative electrode, respectively are lead out from the same side face of the pack; a metallic battery can in which one opening from which the battery cell is inserted is formed and which accommodates the battery cell therein such that the side face from which the positive electrode terminal and the negative electrode terminal are lead out is faced towards the opening side; and a lid made of a synthetic resin in which terminal parts to be connected to the electrodes of the electronic appliance upon being connected to the positive electrode terminal and the negative electrode terminal and being faced outwardly are provided and which plugs the opening of the battery can, the battery cell being accommodated in the battery can upon being adhered onto an inner face thereof.

In accordance with the secondary battery according to an embodiment of the invention, since the battery cell is adhered onto an inner face of the battery can, it is possible to prevent unsteadiness of the battery cell within the battery can and to absorb an impact as caused due to falling or vibration of the battery can or the like, thereby preventing a phenomenon that the impact is applied to a joining part among the positive electrode terminal and the negative electrode terminal and the terminal parts from occurring. By achieving adhesion via an elastic member or folding an overlap width of the battery cell along a side face thereof and then inserting it into the battery can, the elastic member or the folded overlap width can function as a buffer member between the battery cell and the battery can.

In addition, in the secondary battery, when the battery cell is inserted into the battery can upon sticking an insulating film to the elastic member, the insulating film is arranged along the side face of the battery cell to cover an aluminum layer of the pack which is exposed on the cut face of the overlap width part, it is possible to devise to achieve insulation from an inner wall of the battery can. Accordingly, even in the case where the metallic battery can is charged, it is possible to prevent electrolytic corrosion as caused by conductance between the battery can and the aluminum layer of the pack from occurring.

Furthermore, in the secondary battery, the battery can and the lid are each formed in a substantially trapezoidal shape with respect to the cross section thereof such that an edge in each side of the short sides is formed in a circular arc shape, and the battery installing part in the side of the electronic appliance is also formed in the same shape. Thus, in the case where the insertion face is turned inside out, since the edge of the battery installing part and the edge of the secondary batter interfere with each other, thereby inhibiting the insertion, it is possible to surely prevent erroneous insertion.

In addition, in the secondary battery, by forming each of the battery can and the battery cell in a substantially trapezoidal shape with respect to the cross section thereof such that an edge in each side of the short sides is formed in a circular arc shape, it is possible to prevent erroneous insertion of the battery cell into the battery can and to effectively utilize a space within the battery can. In this way, it is possible to provide a clearance which becomes a margin when the battery cell is heat expanded between the battery cell and the inner periphery of the battery can. Accordingly, even in the case where the battery cell is heat expanded, distortion is not generated in the battery can, or an excessive load is not applied to the joining part among the positive electrode terminal and the negative electrode terminal and the terminal parts.

BRIEF DESCRIPTION OF THE ACCOMPANYING DRAWINGS

FIG. 6 is a side view to show a state that a secondary battery to which the invention is applied is installed in a battery installing part which is provided outside an electronic appliance or the like.

FIGS. 8A and 8B are side views to show a state that an electrode part is provided in an engagement member of a battery installing part which is provided outside an electronic instrument or the like.

FIGS. 9A to 9C are views to show a secondary battery to which an external label is stuck, in which FIG. 9A is a back view, FIG. 9B is a plan view, and FIG. 9C is a front view.

FIG. 10 is a cross-sectional view of a second battery to show a state that a battery lid is assembled.

FIGS. 17A to 17C are oblique views to show other example of a secondary battery to which the invention is applied.

FIGS. 18A to 18L are views to show a process chart of a manufacturing process of a secondary battery to which the invention is applied.

FIGS. 22A to 22C are cross-sectional views to show a state that a battery cell is adhered within a battery can using an adhesive.

FIGS. 33A and 33B are cross-sectional views to show the foregoing battery charger in which a secondary battery is installed.

DETAILED DESCRIPTION OF THE PREFERRED EMBODIMENTS

Figure 1A:
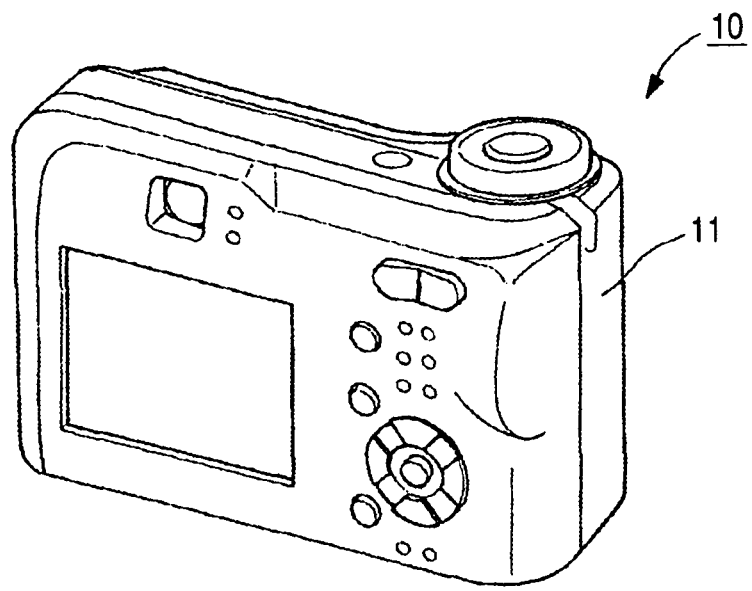
FIGS. 1A and 1B are oblique views to show an example of an electronic appliance using a secondary battery to which the invention is applied.
Figure 1B:
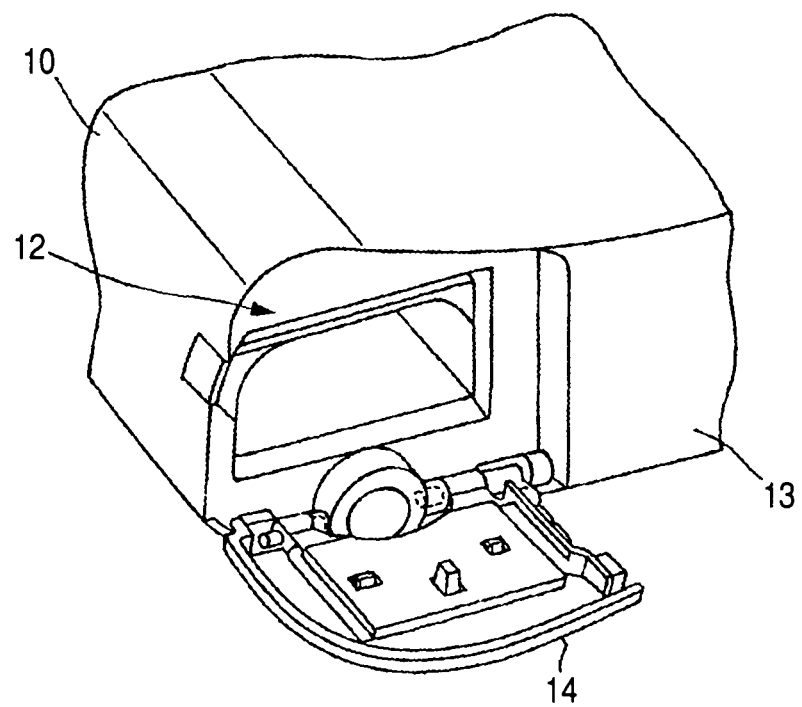

The secondary battery to which the invention is applied will be hereunder described in detail with reference to the accompanying drawings. A secondary battery 1 to which the invention is applied is, for example, a polymer lithium ion secondary battery and as illustrated in FIGS. 1A and 1B, is used for various electronic appliances, for example, electronic appliances such as a digital still camera 10. Concretely, when accommodated in a battery accommodating part 12 as provided inside a grip part 11 of a digital still camera 10 as illustrated in FIG. 1A, the secondary battery 1 supplies a drive power to this digital still camera 10. The battery accommodating part 12 is made of a substantially flat concave in response to the shape of the secondary battery 1 and when a battery lid 14 as provided rotatably in a bottom face part 13 of the digital still camera 10 is opened, is faced outwardly. Furthermore, in the battery accommodating part 12, accommodating part electrodes which are brought into contact with electrode terminal parts 37, 38 which are provided in the secondary battery 1 as described later are formed in the bottom part. Further, when the secondary battery 1 is accommodated in the battery accommodating part 12 such that an end face on which the electrode terminal parts 37, 38 are provided is an insertion end, the secondary battery 1 is connected to the accommodating part electrodes, thereby supplying a power to the digital still camera 10. Incidentally, the battery accommodating part 12 is provided with an energizing member (not illustrated) for discharging the secondary battery 1 from the battery accommodating part 12 and an engagement member 19 for engaging the secondary battery 1 within the battery accommodating part 12 in opposition to the energizing member. This engagement member 19 will be described later.

Figure 2:
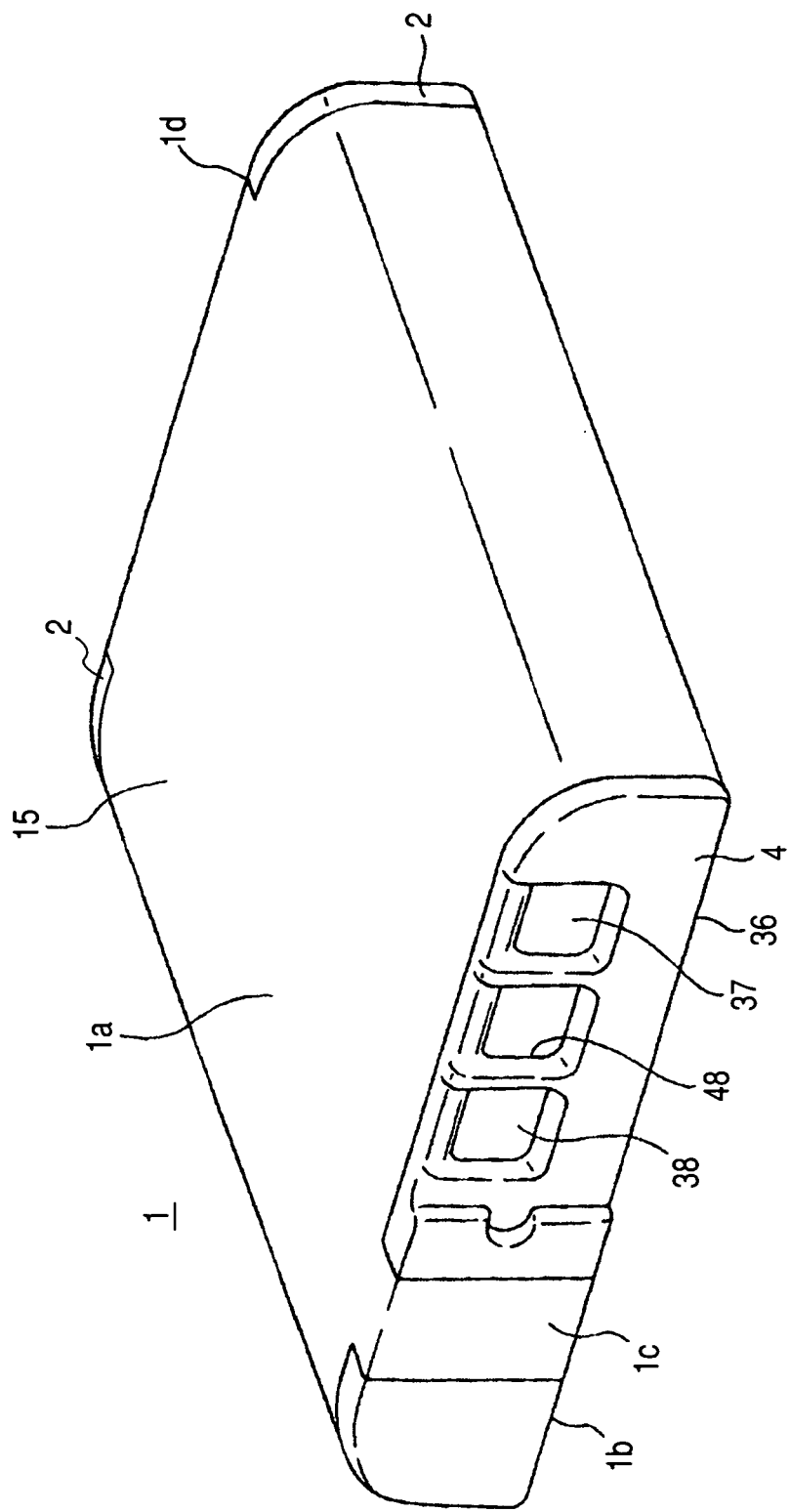
FIG. 2 is an oblique view to show a secondary battery to which the invention is applied.
Figure 3:
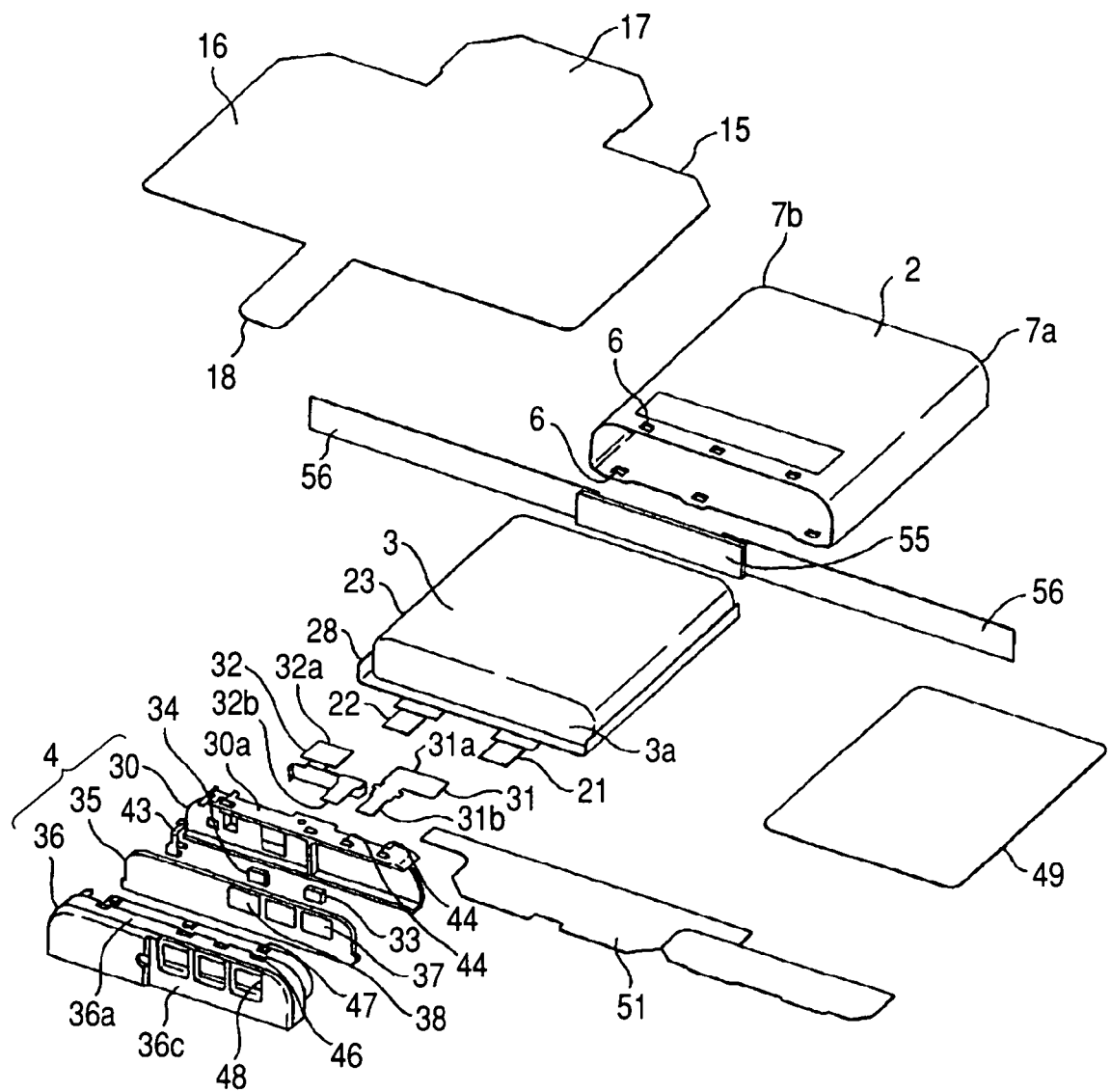
FIG. 3 is a detailed oblique view to show a secondary battery to which the invention is applied.

The secondary battery 1 will be hereunder described. As illustrated in FIG. 2 and FIG. 3, a battery cell 3 having electrode terminals packed therein is inserted from an opening of a metallic battery can 2 which is formed in a substantially flat form, and the opening of the metallic battery can 2 is plugged by a battery lid 4 provided with terminal parts to which a positive electrode terminal and a negative electrode terminal as lead out from the battery cell 3 are connected, thereby forming this secondary battery 1.

The battery can 2 is made of a metallic casing in which one face of a substantially flat cube is opened and is formed in a substantially trapezoidal shape with respect to the cross section thereof such that an edge in each side of the short sides is formed in a circular arc shape as illustrated in FIG. 3. This battery can 2 is formed in a substantially flat cube in which an opening 5 for inserting the battery cell 3 is formed only on one face by molding a metallic material such as iron by deep drawing. By regulating a wall thickness at approximately 0.3 mm, this battery can 2 is formed in a slim shape such that when an accommodating region of the battery cell 3 is eliminated, its own thickness is controlled to the utmost; and at the same time, by using the metallic material, the battery can 2 can be provided with various impact resistances against falling, vibration, and so on, or with mechanical strengths against a sharp knife or the like, thereby preventing deformation, perforation or the like from occurring. The opening 5 is an insertion end from which the battery cell 3 is inserted and after insertion of the battery cell 3, is plugged by the battery lid 4. For that reason, plural engagement holes 6 with which engagement convexes 47 as projected on the battery lid 4 are perforated in the periphery of the opening 5. In the engagement holes 6, when the battery lid 4 is inserted into the opening 5, the engagement convexes 47 as projected on the battery lid 4 invade into the opening 5 while being warped and are then engaged with the engagement holes 6. In this way, the battery lid 4 is assembled in the battery can 2.

Figure 4A:
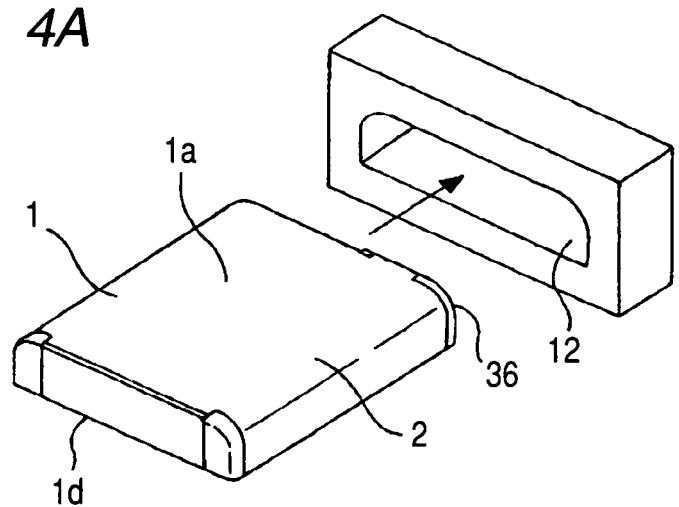
FIGS. 4A and 4B are oblique views to show a state that a secondary battery to which the invention is applied is installed in a battery accommodating part of an electronic appliance.
Figure 4B:
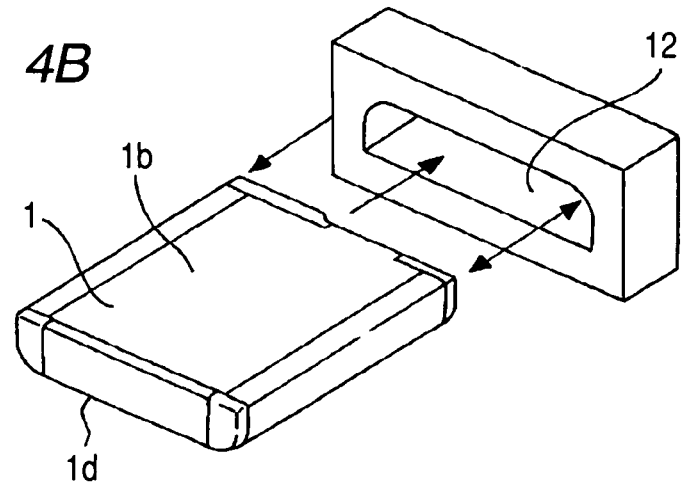

When the shape of the battery accommodating part 12 into which the secondary battery 1 is inserted together with the battery can 2 is formed in a substantially trapezoidal shape with respect to the cross section thereof such that an edge in each side of the short sides is formed in a circular arc shape as illustrated in FIG. 4A, an insertion face of the secondary battery 1 into the battery accommodating part 12 of the digital still camera 10 is defined so that erroneous insertion can be prevented. That is, as illustrated in FIG. 4A, in the case where the insertion face of the secondary battery 1 is right, the sides of the short sides of the battery accommodating part 12 are coincident with the shape of the principal face of the sides of the short sides of the secondary battery 1 so that the secondary battery 1 can be smoothly inserted. On the other hand, as illustrated in FIG. 4B, in the case where the insertion face of the secondary battery 1 is reversed, square-shaped edges in the side of the long sides of the secondary battery 1 are interfered by the edges formed in a circular arc shape in the sides of the short sides of the battery accommodating part 12 so that the insertion of the secondary battery 1 can be inhibited. In this way, in the case where the insertion face is reversed in the back and front, not only the insertion of the secondary battery 1 into the battery accommodating part 12 can be prevented, but also a user can easily confirm correctness of the insertion face of the secondary battery 1.

Figure 5A:
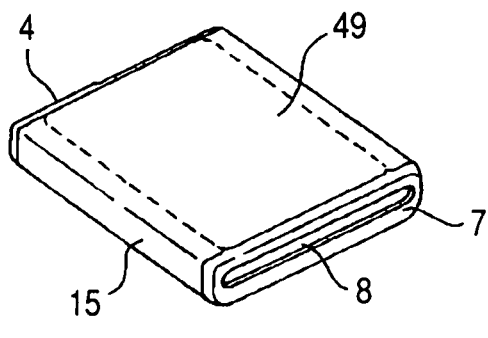
FIGS. 5A and 5B are oblique views to show other example of a secondary battery to which the invention is applied.
Figure 5B:
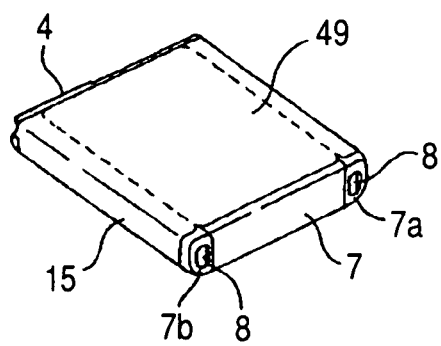
Figure 6:
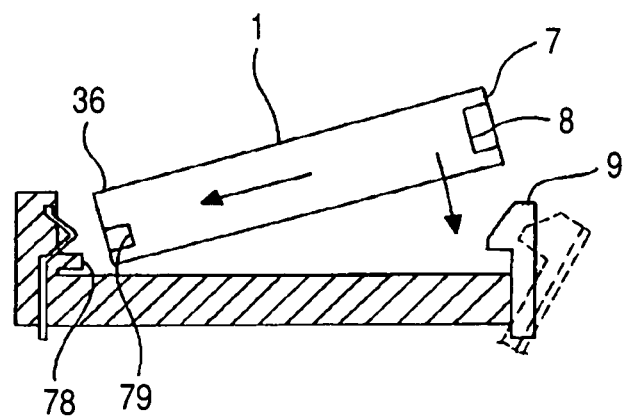
Figure 7:
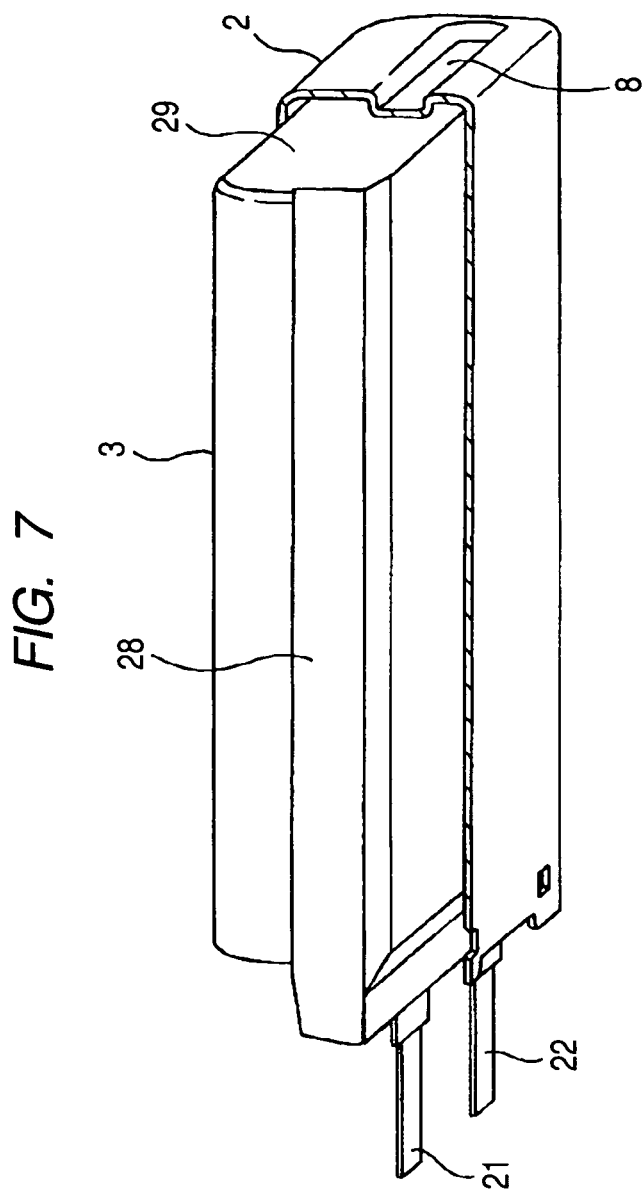
FIG. 7 is an oblique view of a battery can into which a battery cell is inserted.
Figure 30:
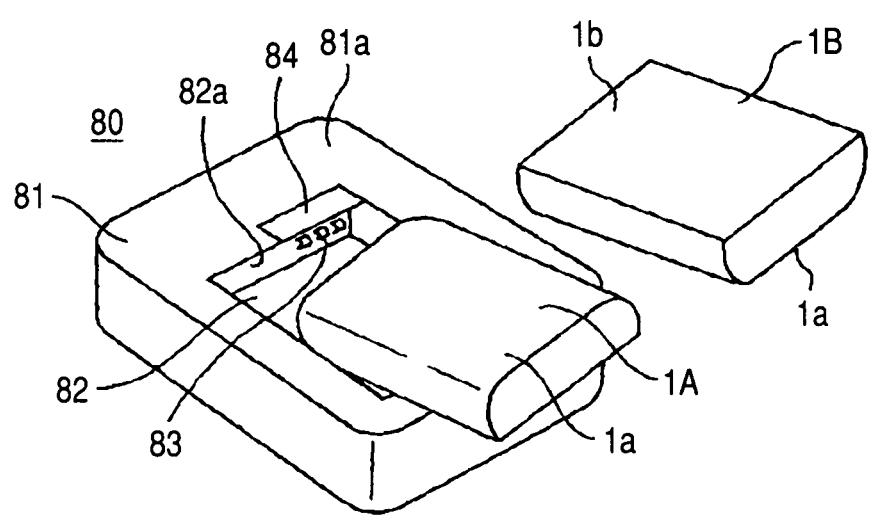
FIG. 30 is an oblique view to show a battery charger for a secondary battery to which the invention is applied.

Incidentally, in the case where the secondary battery 1 is externally attached in a battery installing part as formed in the casing of an electronic appliance separately from the battery accommodating part 12 in the bottom face part 7 opposing to the opening 5 or is installed in a battery installing part of a battery charger 80 as illustrated in FIGS. 5A, 5B, and 30, an engagement hole 8 to be engaged with an engagement member 9 as projected in the battery installing part of the electronic appliance or battery charger may be formed in the battery can 2 as illustrated in FIG. 6. As illustrated in FIG. 7, since a concave 29 is generated on an insertion end face 3b of the battery cell 3 as described later, when this engagement hole 8 is formed corresponding to the concave 29, it is formed without interfering with a battery element 20 which is configured to have a positive electrode, a negative electrode and an electrolyte as accommodated within the battery cell 3.

Incidentally, FIG. 5A is a view to show an example in which an engagement hole 8 is formed over the full length in a longitudinal direction of the bottom face part 7; and in this case, in the battery can 2, a first winding part 17 is not provided in an external label 15 as described later, and the bottom face part 7 is exposed externally over the full length. Furthermore, FIG. 5B is a view to show an example in which one pair of engagement holes 8, 8 are formed in both end parts in a longitudinal direction of the bottom face part 7; and in this case, a first winding part 17 for sticking a region exclusive of the both end parts in which the engagement holes 8, 8 are formed is provided in the external label 15.

Further, as illustrated in FIG. 6, when the secondary battery 1 is engaged with the engagement member 9 which is rotatably energized in an engagement direction of the battery can 2, the secondary battery 1 can be externally attached in the outside of a casing of an electronic appliance or the like. In this way, in addition to the secondary battery 1 which is accommodated in the battery accommodating part, the separate secondary battery 1 can be easily externally attached in the electronic appliance, whereby the use time of the electronic appliance can be extended.

The engagement hole 8 is not limited to the examples as illustrated in FIGS. 5A and 5B but can be properly formed in an arbitrary shape. Furthermore, an engagement concave may be provided in the battery installing part, thereby forming an engagement convex provided with a shape corresponding to the engagement concave in the bottom face part 7 of the battery can 2.

Figure 8A:
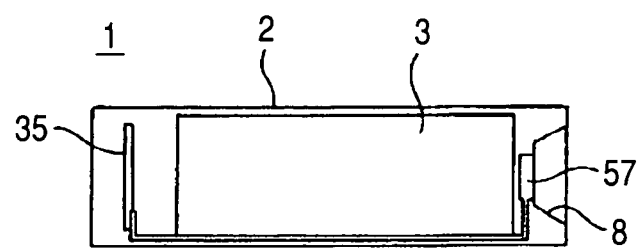
Figure 8B:
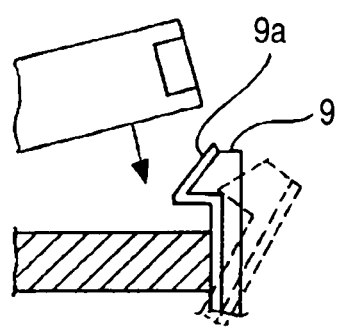

Incidentally, with respect to the secondary battery 1 to which the invention is applied, in addition to an embodiment in which a positive electrode terminal part 37 and a negative electrode terminal part 38 are formed and faced outwardly from a terminal hole 48 as formed on a front face 1c as described later, there may be employed an embodiment in which not only a positive electrode terminal part 37 is formed in a substrate 35, but also the engagement hole 8 as formed in the bottom face part of the metallic battery can 2 is used as a negative electrode or an earth electrode. In this case, as illustrated in FIG. 8A, a can bottom electrode 57 which becomes a negative electrode or an earth electrode is provided in a place for forming the engagement hole 8 in the bottom face part 7 of the battery can 2 and faced outwardly via the engagement hole 8. In this can bottom electrode 57, a negative electrode line or an earth line as connected to the substrate 35 is drawn around and connected. Furthermore, in the engagement member 9 which is engaged with this engagement hole 8, an electrode part 9a as connected to an electrode or an earth part in the electronic appliance side is formed and connected to the can bottom electrode 57 at the time of engaging the engagement hole 8 of the secondary battery 1.

Furthermore, in the battery can 2, after the battery lid 4 is connected, the battery cell 3 is inserted, and the opening 5 is plugged by the battery lid 4, the insulating external label 15 is stuck. The external label 15 becomes a decorative label of the secondary battery 1 and also devises to achieve insulation of the metallic battery can 2. As illustrated in FIG. 3, the external label 15 is provided with a principal face part 16 for winding the outer periphery of the battery can 2 over the opening 5 and the bottom face part 7, a first winding part 17 for winding a region exclusive of the both end parts in a longitudinal direction of the bottom face part 7, and a second winding part 18 for winding a region exclusive of a terminal hole 48 as formed in a top cover 36 of the battery lid 4.

In the external label 15, since the battery can 2 is formed in a flat shape, a sticking work is easy, and the external label 15 is hardly separated as compared with the case of sticking it directly on the surface of the battery cell 3 as configured to pack the battery element 20. The first winding part 17 which is wound in the bottom face part 7 of the battery can 2 is formed in a length shorter than that of the bottom face part 7 and stuck to the bottom face part 7 so that both end parts 7a, 7b in a longitudinal direction of the bottom face part 7 are exposed outwardly. In the battery can 2, an end part of the bottom face part 7 is formed as an engagement part which is engaged with the engagement member 19 as provided in the battery accommodating part 12 of the digital still camera 10. That is, as illustrated in FIGS. 9A and 9B, the secondary battery 1 is formed as an engagement region with which the engagement member 19 in a hook shape for holding the battery can 2 in the battery accommodating part 12 of the digital still camera 10 is engaged. Accordingly, in installing the secondary battery 1, the engagement member 19 is engaged. In this way, the secondary battery 1 which is always energized towards the outside of the battery accommodating part 12 by an energizing member is engaged with the battery accommodating part 12 in opposition to the energizing force. Furthermore, when the engagement member 19 comes off from the bottom face part 7 of the engagement member 19, the secondary battery 1 is discharged from the battery accommodating part 12.

Here, where the first winding part 17 of the external label 15 is entirely stuck on the bottom face part 7, the engagement member 19 rubs the first winding part 17 every time when the secondary battery 1 is inserted into and detached from the battery accommodating part 12, whereby the external label 15 is gradually rubbed and separated. At this issue, since the external label 15 is wound in a region exclusive of the engagement part, the secondary battery 1 is free from rubbing by the engagement member 19 even in the case where it is repeatedly inserted into and detached from the battery accommodating part 12.

Furthermore, in the secondary battery 1, a region of the bottom face part 7 where the first winding part 17 is stuck is corresponding to a region for forming the electrode terminal parts 37, 38 of the battery lid 4. Accordingly, even in the case where the secondary battery 1 is installed in the battery accommodating part 12 or battery charger 80 while reversing the insertion direction, the insulating external label 15 as stuck to the bottom face part 7 of the battery can 2 comes into contact with the electrode terminal of the accommodating part electrode or the battery charger 80 as provided in the bottom face part of the battery accommodating part 12 corresponding to the electrode terminal parts 37, 38, whereby a danger of short circuit as caused due to the direct contact with the metallic battery can 2 can be prevented.

Furthermore, as illustrated in FIG. 9C, the second winding part 18 of the external label 15 is to enhance an assembling strength between the battery lid 4 and the battery can 2 upon being wound in a region exclusive of the terminal hole 48 as formed on the top cover 36 of the battery lid 4. When the assembling strength between the battery lid 4 and the battery can 2 is enhanced by the second winding part 18, as illustrated in FIG. 10, by making an engagement depth between the engagement convex 47 as provided on the top cover 36 of the battery lid 4 and the engagement hole 6 which is engaged with the engagement convex 47 as provided in the periphery of the opening 5 of the battery can 2 as described later large and protecting the engagement convex 47 on the upper face of the battery can 2 from the engagement hole 6, it becomes unnecessary to enhance the assembling strength between the battery can 2 and the battery lid 4. Accordingly, it is possible to obtain a desired assembling strength without hindering the flatness or appearance of the secondary battery 1.

Incidentally, an information label 49 on which a variety of information of the secondary battery 1 is described is stuck in the principal face part of the side of the long sides of the battery can 2.

Figure 11:
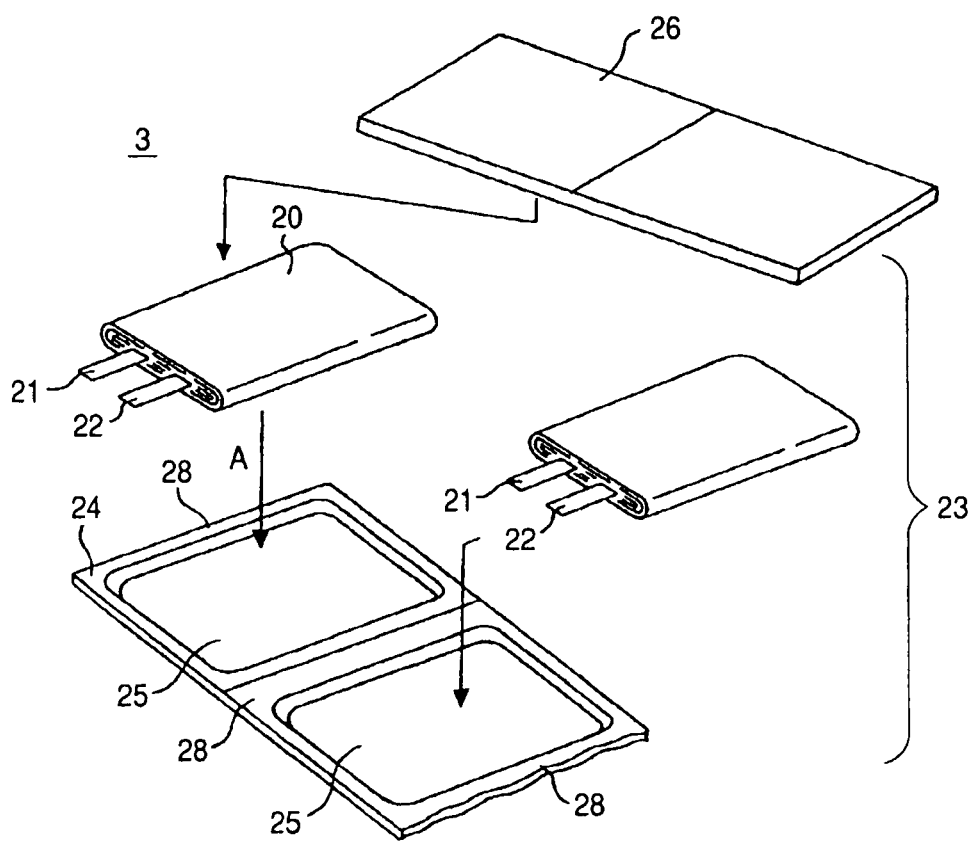
FIG. 11 is a detailed oblique view to show a battery cell.

Next, the battery cell 3 which is accommodated in the battery can 2 will be described below. As illustrated in FIGS. 3 and 11, in the battery cell 3, a strip positive electrode and a strip negative electrode are stacked via a polymer electrolyte layer and/or a separator; the battery element 20 as wound in a longitudinal direction is packed in a pack 23; and a positive electrode terminal 21 and a negative electrode terminal 22 are lead out outwardly from the positive electrode and the negative electrode, respectively.

In the positive electrode, a positive electrode active substance layer is formed on a strip positive electrode collector, and a polymer electrolyte layer is further formed on the positive electrode active substance layer. Furthermore, in the negative electrode, a negative electrode active substance layer is formed on a strip negative electrode collector, and a polymer electrolyte layer is further formed on the negative electrode active substance layer. The positive electrode terminal 21 and the negative electrode terminal 22 are welded to the positive electrode collector and the negative electrode collector, respectively. Furthermore, the positive electrode terminal 21 is made of aluminum (Al), and the negative electrode terminal 22 is formed by using nickel (Ni). These positive electrode terminal 21 and negative electrode terminal 22 are connected to a positive electrode tab 31 and a negative electrode tab 32 as held in the battery lid 4 as described later, respectively and coupled with a positive electrode terminal board 33 and a negative electrode terminal board 34 as similarly provided in the battery lid 4 via these positive electrode tab 31 and negative electrode tab 32, respectively.

The positive electrode can be configured by using, as a positive electrode substance, a metal oxide, a metal sulfide or a specific polymer depending upon the kind of the targeted battery. For example, in the case of configuring a lithium ion battery, it is possible to use a lithium composite oxide containing, as the major component, $Li_xMO_2$ (wherein M represents one or more kinds of a transition metal; and x varies depending upon the charge/discharge state of the battery and is usually from 0.05 to 1.10) as the positive electrode active substance. As the transition metal M which configures the lithium composite oxide, Co, Ni, Mn, and so on are preferable. Specific examples of such a lithium composite oxide include $LiCoO_2$, $LiNiO_2$, $LiNi_yCo_{1-y}O_2$ (wherein 0<y<1), and $LiMn_2O_4$. Such a lithium composite oxide is able to generate a high voltage and become a positive electrode active substance which is excellent in energy density. Furthermore, lithium-free metal sulfides or oxides such as $TiS_2$, $MoS_2$, $NbSe_2$, and $V_2O_5$ can also be used as the positive electrode active substance. A combination of plural kinds of these positive electrode active substances may be used. Furthermore, in forming a positive electrode by using such a positive electrode active substance, known conductive agents or binders or the like can be added.

A material capable of doping or dedoping lithium can be used as the negative electrode material. For example, sparingly graphitized carbon based materials or carbon materials of a graphite based material can be used. More specifically, there can be used carbon materials such as heat decomposable carbons, cokes (for example, pitch coke, needle coke, and petroleum coke), graphites, vitreous carbons, organic polymer compound calcined bodies (materials resulting from carbonization by calcining a phenol resin, a furan resin, etc. at an appropriate temperature), carbon fibers, and active carbons. Besides, polymers such as polyacetylene and polypyrrole and oxides such as $SnO_2$ can be used as the material capable of doping or dedoping lithium. In forming a negative electrode from such a material, known binders or the like can be added.

The polymer electrolyte is one as prepared by mixing a polymer material, an electrolytic solution and an electrolyte salt and incorporating the gelled electrolyte into the polymer. The polymer material has properties such that it is compatible with the electrolyte solution. Examples thereof include silicon gels, acrylic gels, acrylonitrile gels, polyphosphazene-modified polymers, polyethylene oxide, and polypropylene oxide, and composite polymers, crosslinked polymers or modified polymers thereof; and fluorine based polymers such as poly(vinylidene fluoride), poly(vinylidene fluoride-co-tetrafluoropropylene), and poly(vinylidene fluoride-co-trifluoroethylene) and mixtures thereof.

The electrolytic solution component includes an aprotic solvent which is able to disperse the foregoing polymer material therein, for example, ethylene carbonate (EC), propylene carbonate (PC), and butylene carbonate (BC). As the electrolyte salt, one which is compatible with the solvent is used, and a combination of a cation and an anion is used. Examples of the cation which can be used include alkali metals and alkaline earth metals. Examples of the anion which can be used include $Cl^-$, $Br^-$, $I^-$, $SCN^-$, $ClO_4^-$, $BF_4^-$, $PF_6^-$, and $CF_3SO_3^-$. Concretely, lithium hexafluorophosphate or lithium tetrafluorophosphate is used as the electrolytic salt in a concentration such that it can be dissolved in the electrolytic solution.

As illustrated in FIG. 11, the pack 23 which accommodates the battery element 20 therein is formed by cutting a cell aggregate 27 (see FIG. 30) having a substantially rectangular accommodating sheet 24 in which plural accommodating concaves 25 for accommodating the battery element 20 therein are arranged in advance and a sealing sheet 26 as welded on the accommodating sheet 24 in which the battery element 20 is accommodated and capable of sealing each of the accommodating concaves 25 for every battery element 20.

The accommodating sheet 24 is formed in a longitudinal shape such that the plural accommodating concaves 25 are arranged via an overlap width 28 with a prescribed width. The accommodating concaves 25 are formed in a substantially rectangular shape depending upon the shape of the battery element 20. Furthermore, the arrangement direction of the accommodating concaves 25 is not limited to the direction of the short side as illustrated in FIG. 11, but the accommodating concaves 25 may be arranged in a direction of the long side or may be arranged lengthwise and crosswise. The overlap width 28 spacing the respective accommodating concaves 25 is a joining face of the sealing sheet 26 for sealing the accommodating concaves 25. Further, when the battery element 20 is accommodated in each of the accommodating concaves 25 as illustrated by an arrow A in FIG. 11, the sealing sheet 26 is heat welded on the overlap width 28, thereby forming the cell aggregate 27 having the battery elements 20 integrated therein.

Incidentally, at this time, the positive electrode terminal and the negative electrode terminal as extended from the positive electrode and the negative electrode are lead out in the same direction from the joining part with sealing sheet 26. Furthermore, at this time, evacuation is carried out simultaneously with the welding by using a vacuum pump (not illustrated). Due to this suction force, the battery element 20 is sealed in the accommodating concave 25 covered by the accommodating sheet 24 and the sealing sheet 26. Moreover, by sucking the inside of the accommodating concave 25, the pack 23 for accommodating the battery element 20 therein is drawn and squeezed and is formed in a substantially trapezoidal shape with respect to the cross section thereof such that an edge in each side of the short sides is formed in a circular arc shape, in which a second face side which is the bottom face side of the accommodating concave 25 is small, whereas a first face side which is the opening side is large, depending upon the shape of the battery element 20.

Furthermore, in the battery cell 3, a clearance is provided between the battery element 20 and the accommodating sheet 24 in such a manner that the battery element 20 is not pressed against the side face of the accommodating concave 25. Further, when the accommodating sheet 24 and the sealing sheet 26 are sealed while being drawn ad squeezed, the concave 25 is formed on the face in the side opposite to the battery cell 3 from which the positive electrode terminal 21 and the negative electrode 22 are lead out (see FIG. 7). Moreover, after sealing the accommodating sheet 24 and the sealing sheet 26, in each of the battery cells 3, the principal face in the side of the sealing sheet 26 is formed in a flat shape by pressing. Thereafter, the cell aggregate 27 is cut along the overlap width 28 and separated every pack 23 having the battery element 20 sealed therein, thereby forming the battery cells 3.

Incidentally, in addition to the formation of the battery cell 3 by forming the cell aggregate 27 and cutting it along the overlap width 28, the battery cell 3 may be formed by accommodating the battery element 20 in a previously cut accommodating sheet for every individual battery cell and joining with a sealing sheet which is similarly cut for every individual battery cell.

Figure 12:
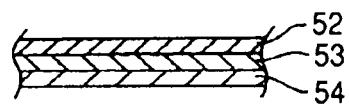
FIG. 12 is a cross-sectional view to show the structure of a pack of a battery cell.

Each of the accommodating sheet 24 and the sealing sheet 26 which configure the pack 23 has a stack structure in which a polypropylene (PP) layer 52, an aluminum (Al) layer 53, and a nylon layer 54 are stacked in this order from the inside as illustrated in FIG. 12. Here, the aluminum layer 53 is used for the purpose of preventing the invasion of moisture into the pack 23 and preventing the expansion of the battery element 20. Furthermore, the polypropylene layer 52 not only prevents the denaturation of the polymer electrolyte but also becomes a joining face between the accommodating sheet 24 and the sealing sheet 26. That is, joining of the accommodating sheet 24 and the sealing sheet 26 is carried out by opposing the polypropylene layers 52 to each other and heat melting them at about 170° C.

Incidentally, the configuration of the pack 23 is not limited thereto, but laminate films having various materials and stack structures and the like can be employed. Furthermore, the joining method is not limited to the heat melting. Examples of the configuring material of the pack 23 include aluminum, polyethylene terephthalate (PET), non-axially stretched polypropylene (CPP), acid-modified polypropylene, ionomers, and ON.

The battery lid 4 having a terminal part to be connected to the positive electrode terminal 21 and the negative electrode terminal 22 which are lead out from the same side face of the battery cell 3 and plugging the opening 5 of the battery can 2 is configured to have a holder 30 for inserting and holding the positive electrode tab 31 and the negative electrode tab 32 which are connected to the positive electrode terminal 21 and the negative electrode terminal 22, respectively, the substrate 35 provided with the positive electrode terminal board 33 and the negative electrode terminal board 34 which are connected to the positive electrode tab 31 and the negative electrode tab 32, respectively, and the top cover 36 which sandwiches the holder 30 together with the substrate 35 and which is engaged with the opening 5 of the battery can 2 and is manufactured by integrally assembling the folder 30, the substrate 35 and the top cover 36 as illustrated in FIG. 3.

The holder 30 is a component as formed in a substantially trapezoidal flat plate shape such that an edge in each side of the short sides is formed in a circular arc shape, which is prepared by mold forming a synthetic resin in substantially the same shape as the opening 5 of the battery can 2. In this holder 30, one pair of insertion holes 41, 42 through which the positive electrode tab 31 and the negative electrode tab 32 are inserted, respectively are formed in the vicinity of the side faces of the sides of the short sides, and by inserting and holding the positive electrode tab 31 and the negative electrode tab 32 in the insertion holes 41, 42, respectively, it is devised to position the positive electrode tab 31 and the negative electrode tab 32 and also to prevent falling of the secondary battery 1 or position deviation as caused following the vibration or the like. Accordingly, the positive tab 31 and the negative electrode tab 32 are able to prevent a situation that welding between the positive electrode terminal 21 and the negative electrode terminal 22 comes out due to falling or position deviation as caused following the vibration or the like.

The positive electrode tab 31 and the negative electrode tab 32 are provided for the purpose of connecting the positive electrode terminal 21 and the negative electrode terminal 22 which are lead out from the battery cell 3 to the positive electrode terminal board 33 and the negative electrode terminal board 34 as provided in the substrate 35 which becomes an electrode terminal of the secondary battery 1, and when inserted and supported in the holder 30, one ends 31a, 32a are extended to the side of the battery cell 3, whereas the other ends 31b, 32b are extended and held in the side of the substrate 35. In these positive electrode tab 31 and negative electrode tab 32, by using nickel (Ni), the one ends 31a, 32a are disposed on the positive electrode terminal 21 and the negative electrode terminal 22, respectively, the other ends 31b, 32b are disposed on the positive electrode terminal board 33 and the negative electrode terminal board 34 as provided on the substrate 35, respectively, and four points are then welded collectively by spot welding. This is because since the positive electrode terminal 21 is formed by using aluminum (Al), if the positive electrode terminal 21 is welded directly to the positive electrode terminal board 33, the aluminum is molten so that the connection cannot be achieved. Accordingly, by mediating the positive electrode tab 31 and the negative electrode tab 32 and carrying out welding from the upper side, the positive electrode terminal 21 is connected to the positive electrode terminal board 33, and the negative electrode terminal 22 is connected to the negative electrode terminal board 34.

Figure 13:
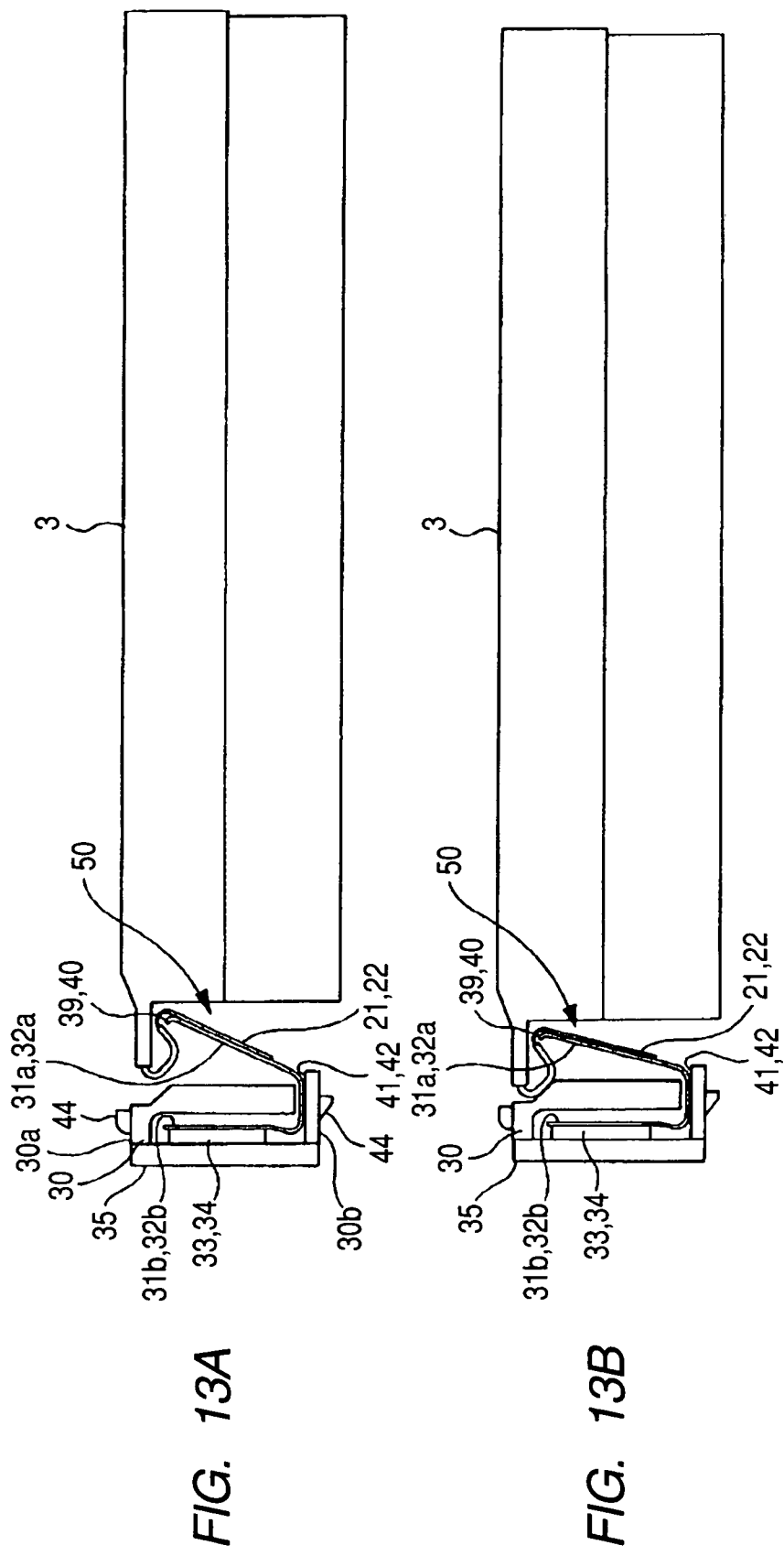
FIGS. 13A and 13B are side views to show joining between a positive or negative electrode terminal of a battery cell and a positive or negative electrode tab.
Figure 14:
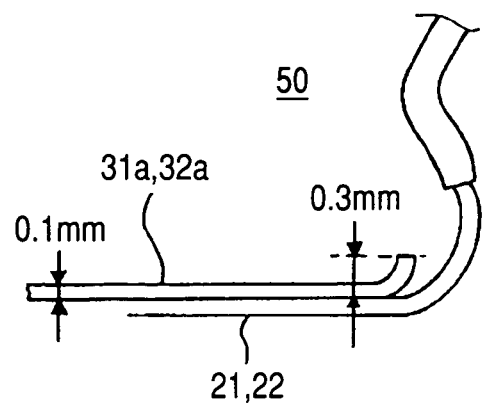
FIG. 14 is a side view to show a joining part between a positive or negative electrode terminal and a positive or negative tab.

Furthermore, as illustrate in FIGS. 13A and 13B, in the respective one ends 31a, 32a of the positive electrode tab 31 and the negative electrode tab 32, folding parts 39, 40 in which tip edges thereof are folded towards the face in the opposite side to the contact face coming into contact with the positive electrode terminal 21 and the negative electrode terminal 22 are formed. In the folding parts 39, 40, as illustrated in FIG. 14, the positive electrode tab 31 and the negative electrode tab 32 each has a thickness of 0.1 mm, whereas the tip thereof is folded in a height of about 0.3 mm. In this way, by folding the tip side, the positive electrode tab 31 and the negative electrode tab 32 are each made to stand up in a circular arc shape and joined with the positive electrode terminal 21 and the negative electrode terminal 22, respectively as described later. Thereafter, when a joining part 50 is folded, even in the case where the tip comes into contact with the positive electrode terminal 21 or the negative electrode terminal 22, it is possible to prevent the generation of a situation that the positive electrode terminal 21 or the negative electrode terminal 22 is damaged or cut.

Incidentally, an earth 43 for discharging an electric charge as charged on the battery can 2 is connected to the negative electrode tab 32. When the earth 43 is supported by the holder 30, one end thereof can be connected to the negative electrode tab 32, whereas the other end can be brought into contact with the inner surface of the battery can 2. In this way, even in the case where an electric charge is charged on the metallic battery can 2, the electric charge can be discharged into the negative electrode tab 32 through the earth 43 so that there is no possibility for causing an erroneous operation of a microcomputer within the secondary battery 1 or an electronic appliance having the secondary battery 1 installed therein due to the electric charge as charged on the battery can 2. Incidentally, the earth may be connected to the substrate 35, thereby discharging an electric charge into the negative electrode tab 32 through the substrate 35.

Furthermore, on upper and lower faces 30a, 30b of the holder 30, plural coupling projections 44 which are inserted and engaged in coupling holes 46 as provided on the top cover 36 are intermittently formed over the longitudinal direction. When the coupling projections 44 are engaged in the coupling holes 46, the holder 30 is coupling with the top cover 36, thereby sandwiching the substrate 35.

The substrate 35 is a rigid substrate on which a circuit pattern for supplying an electric current flowing from the battery cell 3 into an electronic appliance via the terminal boards 33, 34 is formed and mounted with the positive electrode terminal board 33 and the negative electrode terminal board 34 which are welded to the other ends 31b, 32b of the positive electrode tab 31 and the negative electrode tab 32, respectively. The positive electrode terminal board 33 and the negative electrode terminal board 34 are connected to the positive electrode terminal part 37 and the negative electrode terminal part 38, respectively as formed on the face in the opposite side to the mounting face. Further, in the substrate 35, the positive electrode terminal part 37 and the negative electrode terminal part 38 are faced outwardly via the terminal holes 48 as provided on the top cover 36 and brought into contact with the electrode terminals as provided in the side of the digital still camera 10 or the battery charger 80.

The positive electrode terminal part 37 and the negative electrode terminal part 38 are formed in a different arrangement from each other depending upon the function of the secondary battery 1. The reasons for this are as follows. In the secondary battery 1 which is used in various electronic appliances, there is some case where nevertheless the external shape is identical with respect to the battery can 2 or the battery lid 4, by making the battery capacity different depending upon an electronic appliance to be used, or by making a compatible electronic appliance different, plural types of the secondary batteries 1 which are incompatible with each other are provided. Furthermore, there is some case where there are provided a plural number of the secondary batteries 1 having a different function from each other such as a combination of a type provided with a residual battery life display part such as an LED display part or a liquid crystal display part and a residual battery life display button, thereby bringing a residual battery life display function and a type not having such a residual battery life display function; and a combination of a type which is able to achieve quick recharge and a type which is not able to achieve quick recharge.

However, since the external shape of the secondary battery 1 is identical in all types having any function, there is some possibility that the secondary battery 1 is installed in an incompatible electronic appliance. Then, by making the arrangement of the positive electrode terminal part 37 and the negative electrode terminal part 38 different for every function and similarly making the arrangement of electrode terminals of a compatible electronic appliance different, it becomes possible to prevent any trouble as caused due to erroneous installation of the secondary battery.

Figure 15A:
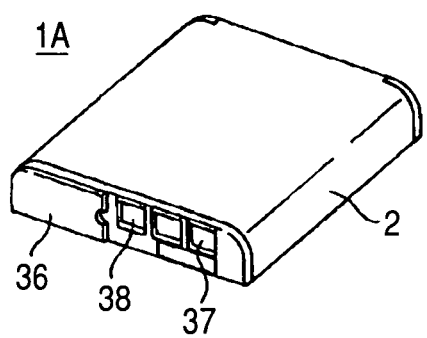
FIGS. 15A and 15B are oblique views to show a secondary battery in which the arrangement of positive and negative electrode terminal parts is made different depending upon the function.
Figure 15B:
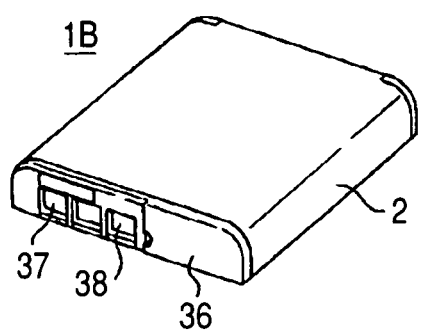
Figure 16A:
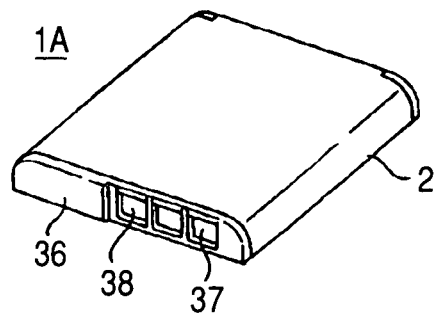
FIGS. 16A and 16B are oblique views to show other secondary battery in which the arrangement of positive and negative electrode terminal parts is made different depending upon the function.
Figure 16B:
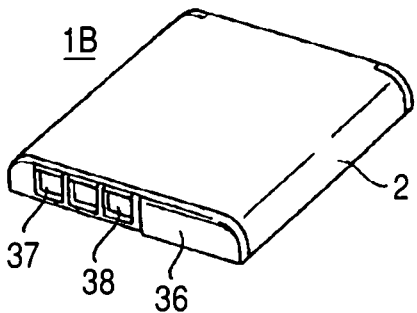

Concretely, the positive electrode terminal part 37 and the negative electrode terminal part 38 are arranged in a position of substantial point symmetry for every function. For example, in a secondary battery 1A having a battery capacity of 760 mAh as illustrated in FIG. 15A and a secondary battery 1B having a high battery capacity of 830 mAh as illustrated in FIG. 15B, the positive electrode terminal part 37 and the negative electrode terminal part 38 are arranged in a position of substantial point symmetry as rotated through 180 degrees. Incidentally, the positive electrode terminal part 37 and the negative electrode terminal part 38 may be arranged in a position of bilateral symmetry for every function as illustrated in FIGS. 16A and 16B. Furthermore, the arrangement shape of substantial point symmetry can be properly selected.

In this way, by making the arrangement of the positive electrode terminal part 37 and the negative electrode terminal part 38 different depending upon the function of the secondary battery 1 and making the arrangement of electrode terminals of an electronic appliance corresponding to the function different, even in the case where the secondary battery 1 is installed in an incompatible electronic appliance, since the electrode terminals in the electronic appliance side do not come into contact with the electrode terminals in the side of the secondary battery 1, it is possible to prevent any trouble as caused due to erroneous installation of the incompatible secondary battery 1.

In the substrate 35, a circuit pattern and a land are formed by etching with a copper foil as stuck on an insulating substrate or the like, and the positive electrode terminal board 33 and the negative electrode terminal board 34 are mounted on the land by reflow soldering. As described previously, the positive electrode terminal board 33 and the negative electrode terminal board 34 are soldered on the positive tab 31 and the negative tab 32 together with the positive electrode terminal 21 and the negative electrode terminal 22, respectively. Furthermore, the positive electrode terminal part 37 and the negative electrode terminal part 38 are formed on the land as formed in a prescribed place by gilding or the like.

Incidentally, if desired, the substrate 35 may be provided with a heat-sensitive element such as PTC (positive temperature coefficient) for detecting the temperature of the secondary battery 1 to achieve charge control or safety control. By providing a heat-sensitive element, when the temperature is elevated, the secondary battery 1 is able to shut and control an input/output circuit.

The top cover 36 which sandwiches the substrate 35 together with the holder 30 is a component in a substantially trapezoidal flat plate shape such that an edge in each side of the short sides is formed in a circular arc shape, which is prepared by mold forming a synthetic resin in substantially the same shape as the opening 5 of the battery can 2. In the top cover 36, on an upper face 36a in the side of the short side and a lower face 36b in the side of the long side, plural coupling holes 46 in which plural coupling projections 44 as projected on the holder 30 are inserted and engaged are intermittently formed corresponding to the coupling projections 44. Furthermore, in the top cover 36, the plural engagement convexes 47 which are engaged with the engagement holes 6 as formed in the periphery of the opening 5 of the battery can 2 are formed on the upper face 36a and the lower face 36b. Further, when the top cover 36 is inserted into the battery can 2 from the opening 5 in such a manner that the upper face 36a and the lower face 36b are slightly warped, the engagement convexes 47 are engaged with the engagement holes 6 and assembled in the battery can 2.

Furthermore, in the top cover 36, the terminal holes 48 from which the positive electrode terminal part 37 and the negative electrode terminal part 38 as formed in the substrate 35 are faced outwardly are perforated on the front face 36c, and the positive electrode terminal part 37 and the negative electrode terminal part 38 are brought into contact with the electrode terminals in the side of an electronic appliance such as the digital still camera 10 or the battery charger 80 via the terminal holes 48. Incidentally, the terminal hole 48 is, for example, provided in three places depending upon the terminal part as formed in the substrate 35 and can be made to work for a positive electrode terminal, a negative electrode terminal and for a terminal for information such as residual battery life, respectively. Incidentally, the number of the terminal holes 48 can be properly increased or decreased depending upon the terminal part as provided in the substrate 35.

When the positive electrode terminal 21 and the negative electrode terminal 22 of the battery cell 3 are connected to the positive electrode terminal board 33 and the negative electrode terminal board 34 of the substrate 35 via the positive electrode tab 31 and the negative electrode tab 32 as held in the holder 30, respectively and the coupling projections 44 of the holder 30 are then inserted into the coupling holes 46, the top cover 36 is coupled with the holder 30 while sandwiching the substrate 35 therebetween, thereby forming the battery lid 4. Thereafter, when the engagement convexes 47 of the top cover 36 are engaged with the engagement holes 6 as formed in the periphery of the opening 5 of the battery can 2, the battery lid 4 is assembled in the battery can 2, thereby forming the secondary battery 1.

Incidentally, in the top cover 36, as illustrated in FIGS. 17A, 17B and 17C, in the case where it is externally attached in a battery installing part as formed in the casing of an electronic appliance separately from the battery accommodating part 12 on the front face 36c or in the case where it is installed in a battery installing part of the battery charger 80, engagement parts 79 which are engaged with engagement projections 78 as projected in the battery installing part of the electronic appliance or the battery charger may be formed. In the secondary battery 1, as illustrated in FIG. 6, the battery can 2 is installed while engaging the engagement parts 79 with the engagement projections 78. The secondary battery 1 is formed such that the battery can 2 is attached while the engagement parts 79 are engaged with the engagement projections 78 as shown in FIG. 6. The engagement parts 79 can be easily formed in mold forming the top cover 36. Incidentally, FIG. 17A shows an example in which the engagement parts 79 are formed in a concave form in the both ends of the front face 36c of the top cover 36; FIG. 17B shows an example in which the both ends of the engagement parts 79 in a concave form are notched; and FIG. 17C shows an example in which engagement concaves are provided in the battery installing part, and convex engagement parts 79 provided with a shape corresponding to the engagement convexes are formed in the top cover 36 of the secondary battery 1.

Incidentally, in this specification, with respect to the secondary battery 1, the principal face in the side of the short side of the battery can 2 is referred to as the upper face 1*a* of the secondary battery 1; the principal face on the side of the long side of the battery can 2 is referred to as the lower face 1*b* of the secondary battery 1; the front face 36*c* of the top cover 36 is referred to as the front face 1*c* of the secondary battery 1; and the bottom face part 7 of the battery can 2 is referred to as the back face 1*d* of the secondary battery 1.

Next, the manufacturing process of the secondary battery 1 will be described below with reference to FIGS. 18A to 18L. First of all, as illustrated in FIG. 18A, the battery cell 3 and the substrate 35 are arranged in a jig, the details of which are omitted. Incidentally, at this time, the battery cell 3 is cut along the overlap width 28 of the cell aggregate 27 and the overlap width 28 is folded along the side face of the battery cell 3 into a substantially trapezoidal shape with respect to the cross section thereof, thereby making it easy for handling; and as described later, in accommodating in the battery can 2, when the folded overlap width 28 is arranged between the side face of the battery can 2 and the battery cell 3, it functions as a buffer member. Furthermore, in the substrate 35, a prescribed circuit pattern and the positive electrode terminal part 37 and the negative electrode terminal part 38 are formed, and the positive electrode terminal board 33 and the negative electrode terminal board 34 are reflow soldered.

Incidentally, with respect to the formation of the battery cell 3, in addition to the case of forming the cell aggregate 27 and cutting it along the overlap width 28, a sealing sheet may be joined with an accommodating sheet having the battery element 20 accommodated therein for every individual battery cell.

The battery cell 3 is arranged in such a manner that the joining face between the accommodating sheet 24 from which the positive electrode terminal 21 and the negative electrode terminal 22 are lead out and that the sealing sheet 26 are faced upwardly and that the bottom part of the accommodating concave 25 is faced downwardly. That is, the battery cell 3 in a substantially trapezoidal form with respect to the cross section thereof is arranged in such a manner that the side of the short side is faced downwardly and that the side of the long side from which the positive electrode terminal 21 and the negative electrode terminal 22 are lead out is faced upwardly. Furthermore, the battery cell 3 is arranged in such a manner that the lead-out face 3*a* from which the positive electrode terminal 21 and the negative electrode terminal 22 are lead out is faced towards the side of the substrate 35. The substrate 35 is arranged in such a manner that the mounting face on which the positive electrode terminal board 33 and the negative electrode terminal board 34 are mounted is faced upwardly and that the side of the short side in a substantially trapezoidal shape is faced towards the side of the lead-out face 3*a* of the battery cell 3.

Figure 19:
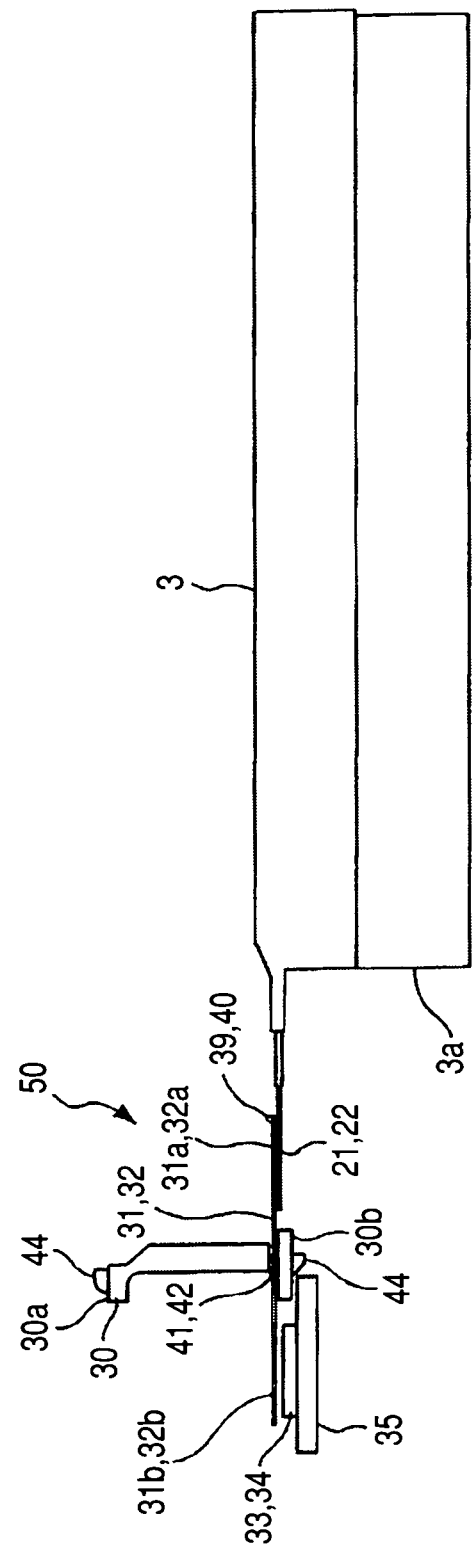
FIG. 19 is a side view to show a battery cell, a holder and a substrate as placed in a jig.

Next, as illustrated in FIG. 18B, in the holder 30, the positive electrode tab 31 and the negative electrode tab 32 are inserted in and held by the insertion holes 41, 42. Furthermore, at this time, the earth 43 is also installed in the holder 30. Next, as illustrated in FIG. 18C, by installing this holder 30 in a jig, the holder 30 is arranged between the battery cell 3 and the substrate 35. In the holder 30, the side of the short side in a substantially trapezoidal shape in which the positive electrode tab 31 and the negative electrode tab 32 are held is faced downwardly and positioned with the short side of the substrate 35. Furthermore, in the holder 30, the one end 31*a* of the positive electrode tab 31 is superposed on the positive electrode terminal 21 of the battery cell 3, and the one end 32*a* of the negative electrode tab 32 is superposed on the negative electrode terminal 22. Moreover, the other end 31*b* of the positive electrode tab 31 is superposed on the positive electrode terminal board 33 of the substrate 35, and the other end 32*b* of the negative electrode tab 32 is superposed on the negative electrode terminal board 34. In this way, the positive electrode terminal 21 and the negative electrode terminal 22 of the battery cell 3, the positive electrode tab 31 and the negative electrode tab 32 of the holder 30, and the positive electrode terminal board 33 and the negative electrode terminal board 34 of the substrate 35 are placed on substantially the same plane (see FIG. 19).

Next, four places of the one end 31*a* and the other end 31*b* of the positive electrode tab 31 and the one end 32*a* and the other end 32*b* of the negative electrode tab 32 are welded from the upper side, respectively, thereby joining the positive electrode terminal 21 of the battery cell 3 to the one end 31*a* of the positive electrode tab 31, the negative electrode terminal 22 to the one end 32*a* of the negative tab 32, the positive electrode terminal board 33 of the substrate 35 to the other end 31*b* of the positive electrode tab 31, and the negative electrode terminal board 34 to the other end 32*b* of the negative electrode tab 32, respectively. Here, though aluminum (Al) is used for the positive electrode terminal 21, since the positive electrode terminal 21 is welded from the upper side of the positive electrode tab 31 made of nickel, the both can be surely joined to each other without the generation of dissolution by heat.

Next, as illustrated in FIG. 18D, the substrate 35 is made to stand up, thereby superposing the holder 30 thereon. At this time, in the respective other ends 31*b*, 32*b* of the positive electrode tab 31 and the negative electrode tab 32 which are held by the holder 30, the base end parts which are projected from the insertion holes 41, 42 in the side of the substrate 35 are folded along the standing-up direction of the substrate 35.

Next, as illustrated in FIG. 18E, insulating paper 51 is stuck so as to cover the joining part 50 among the positive electrode terminal 21 and the negative electrode terminal 22 and the one end 31*a* of the positive electrode tab 31 and the one end 32*a* of the negative electrode tab 32. The insulating paper 51 not only reinforces the joining part 50 among the positive and negative electrode terminals 21, 22 and the positive and negative electrode tabs 31, 32 but also prevents the generation of a short circuit due to the contact between the metallic battery can 2 and the joining part 50 and the generation of a short circuit between the positive electrode and the negative electrode due to deformation of the positive electrode tab 31 and the negative electrode tab 32. In the insulating paper 51, an adhesive layer is formed in the side of one face, and by folding the insulating paper 51 while sandwiching the joining part 50 as illustrated in FIG. 18F, the adhesive layers are stuck to each other, thereby achieving sticking.

Next, as illustrated in FIG. 18G, the holder 30 is coupled with the top cover 36, thereby forming the battery lid 4. Thereafter, as illustrated in FIG. 18H and FIGS. 13A and 13B, the joining part 50 on which the insulating paper 51 is stuck among the positive electrode terminal 21 and the negative electrode terminal 22 and the one end 31*a* of the positive electrode tab 31 and the one end 32*a* of the negative electrode tab 32 is folded in a substantially S-shaped form such that the lead-out face 3*a* of the battery cell 3 and the battery lid 4 are faced at each other. In this way, by accommodating the joining part 50 in a curved state in the battery can 2, even in the case where an impact is applied between the battery cell 3 and the battery lid 4 by falling, vibration, or the like, a load of the impact is absorbed by the joining part 50 as folded in a substantially S-shaped from and accommodated so that it is possible to prevent separation or breakage of the positive electrode terminal 21 and the negative electrode terminal 22 and the positive electrode tab 31 and the negative electrode tab 32 from occurring (see FIGS. 13A and 13B).

Next, as illustrated in FIG. 18I, in the battery cell 3, an elastic member 55 having a slight thickness and having an adhesive layer formed on the both sides thereof is stuck on the insertion end face 3b into the battery can 2. This elastic member 55 not only makes the battery cell 3 fix inside the battery can 2, thereby preventing unsteadiness but also absorbs an impact which is applied to the battery cell 3. Examples of the elastic member 55 include a pressure sensitive adhesive double coated tape using a polyurethane foam as a base material. The insertion end face 3b of the battery cell 3 is not formed in a flat shape and is a face in which the shape thereof is liable to be scattered. However, the scattering is absorbed by the elastic member 55 so that the battery cell 3 can be surely adhered to the inside of the battery can 2. Furthermore, the elastic member 55 can absorb an impact which is applied to the battery cell 3 due to falling, vibration, or the like or can reduce a load to the joining part 50 due to heat expansion of the battery cell 3. Thus, the elastic member 55 is able to prevent separation of the positive electrode terminal 21 and the negative electrode terminal 22 and the positive electrode tab 31 and the negative electrode tab 32 from occurring together with the foregoing insulating paper 51.

When the elastic member 55 is formed in a substantially rectangular shape depending upon the shape of the insertion end face 3b of the battery cell 3 and arranged in the both end parts in a longitudinal direction along the side face of the battery cell 3, an insulating film 56 for insulating the overlap width 28 of the battery cell 3 from the battery can 2 is stuck. That is, the accommodating sheet 24 and the sealing sheet 26 which configure the pack 23 of the battery cell 3 are each a sheet in which the polypropylene (PP) layer 52, the aluminum (Al) layer 53, and the nylon layer 54 are stacked in this order from the inside as described previously. When cut along the overlap width 28, the respective layers which configure the sheet are exposed outwardly on the cut face. Among them, when the aluminum layer 53 comes into direct contact with the metallic battery can 2, in the case where the battery can 2 is charged, the aluminum layer 53 becomes a genitive electrode. When the polypropylene layer 52 further has a hole due to some cause, the aluminum layer 53 has a hole by electrolytic corrosion. Further, there is some possibility that when moisture invades from the hole of the pack 23, the battery cell 3 is expanded. Then, by arranging the insulating film 56 along the cut face of the battery cell 3, it is devised to achieve insulation between the battery can 2 and the cut face of the pack 23, thereby preventing the expansion of the battery cell 3 due to moisture absorption of the battery element 20.

Figure 20:
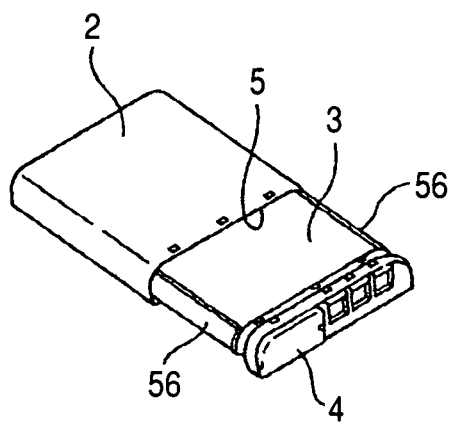
FIG. 20 is an oblique view to show a battery cell which is inserted into a battery can.

The insulating film 56 is a longitudinal film as formed depending upon the side face of the battery cell 3, one end of which is stuck to each of the end parts of the elastic member 55. As illustrated in FIG. 20, when the battery cell 3 is inserted into the battery can 2 from the insertion end face 3b, the insulating film 56 is folded along the side face of the battery cell 3 by a side edge part of the opening 5 of the battery can 2 and arranged between the cut face of the overlap width 28 as folded on the side face of the battery cell 3 and the side face of the battery can 2. In this way, it is possible to prevent the contact between the aluminum layer 53 as exposed on the cut face of the overlap width 28 and the battery can 2.

Figure 21A:
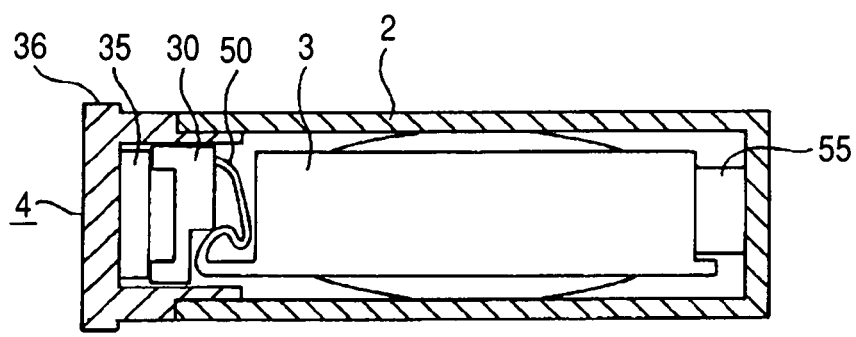
FIGS. 21A to 21C are cross-sectional views to show a state of a battery cell within a battery can.
Figure 21B:
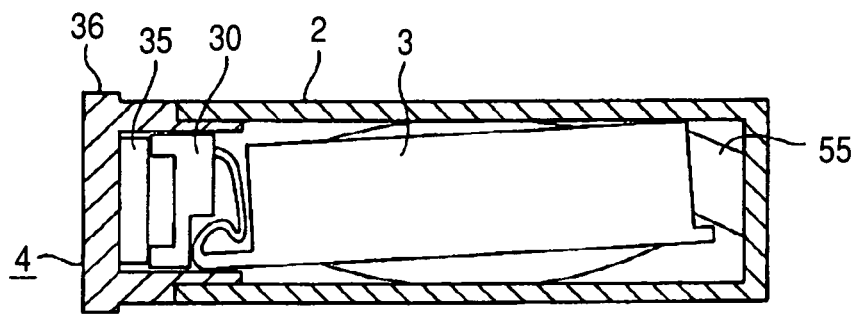
Figure 21C:
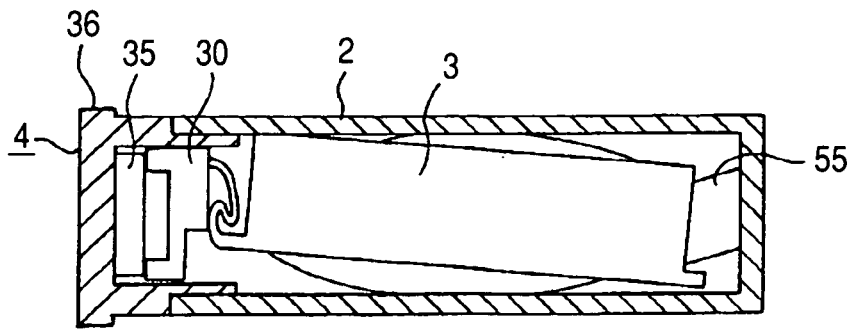

Next, as illustrated in FIG. 18J, the battery cell 3 is inserted into the battery can 2, and the opening 5 of the battery can 2 is plugged by the battery lid 4. At this time, the battery cell 3 is inserted in such a manner that the side of the short side and the side of the long side of the substantially trapezoidal shape with respect to the cross section thereof are made adaptive with the side of the short side and the side of the long side of the battery can 2 as formed similarly substantially trapezoidal shape with respect to the cross section thereof. In this way, a space within the battery can 2 can be effectively utilized so that a prescribed clearance is provided between the battery can 2 and the battery cell 3. As illustrated in FIGS. 21A to 21C, this clearance becomes a margin in the case where the battery cell 3 is expanded by heat or the like so that an excessive load to the joining part 50 or deformation of the battery can 2 as caused due to the expansion of the battery cell 3 can be avoided. Incidentally, FIG. 21A shows the case where the both principal faces of the battery cell 3 are equally expanded; and each of FIGS. 21B and 21C schematically shows the case where the both principal faces of the battery cell 3 are unequally expanded.

Furthermore, in the case where the direction of the battery cell 3 is reversed, since the edge of each side of the long sides of the battery cell 3 interferes with the edge in a circular arc shape as formed in each side of the short sides of the battery can 2, thereby preventing the invasion, it is possible to prevent erroneous insertion from occurring.

As illustrated in FIG. 20, when the battery cell 3 is inserted, the insulating film 56 is arranged along the side face of the battery cell 3 by the side edge of the opening 5 of the battery can 2. Furthermore, the battery cell 3 is adhered to the bottom face part of the battery can 2 by the elastic member 55 as stuck on the insertion end face 3b. Subsequent to the insertion of the battery cell 3, the engagement convexes 47 as projected on the top cover 36 invade into the opening 5 while being warped and are then engaged with the engagement holes 6. In this way, the battery lid 4 is assembled in the opening 5 of the battery can 2.

Furthermore, when the battery lid 4 is assembled in the battery can 2, the joining part 50 among the positive electrode terminal 21 and the negative electrode terminal 22 and the positive electrode tab 31 and the negative electrode tab 32 is arranged in a curved state in a substantially S-shaped form between the battery cell 3 and the holder 30.

Next, as illustrated in FIG. 18K, the external label 15 is stuck to the periphery of the battery can 2. The external label 15 is stuck such that the principal face part 16 winds the outer periphery of the battery can 2; that the first winding part 17 winds a region exclusive of the both end parts in the longitudinal direction of the bottom face part 7; and that the second winding part 18 winds a region exclusive of the terminal hole 48 as formed in the top cover 36 of the battery lid 4. Finally, as illustrated in FIG. 18L, the information label 49 on which a variety of information of the secondary battery 1 is described is stuck in the principal face part of the side of the long sides of the battery can 2 to which the external label 15 has been stuck, thereby completing the second battery 1.

According to the secondary battery 1 having the foregoing configuration, by mutually assembling the metallic battery can 2 and the mold formed battery lid 4, assembling can be easily achieved. Furthermore, by forming the battery can 2 by deep drawing using a metallic material, slimming and insurance of strength can be achieved at the same time so that it is possible to provide a secondary battery which is able to meet the demands for an electronic appliance such as downsizing, slimming and lightweight. In addition, the external shape of the engagement hole 8 or the engagement part 79 which becomes the installing end in installing the secondary battery in a battery installing part of an electronic appliance can be easily formed by processing the metallic battery can 2 or mold forming the battery lid 4 made of a synthetic resin.

Furthermore, in the secondary battery 1, when the battery can 2 and the battery lid 4 are formed in a substantial trapezoidal shape with respect to the cross section thereof in which the edge of each side of the short sides is formed in a circular arc shape and the battery accommodating part 12 in the side of the digital still camera 10 is formed in the same shape, in the case where the insertion face is reversed in the back and front, the edges of the battery accommodating part 12 and the edges of the secondary battery 1 interfere with each other, thereby inhibiting the insertion. Thus, it is possible to surely prevent erroneous insertion.

Furthermore, in the battery can 2, it is possible to provide the can bottom electrode 57 in the bottom face part 7 to which the external label 15 is not stuck, thereby using it as a negative electrode or an earth electrode. Moreover, when the both ends of the bottom face part 7 to which the external label 15 is not stuck are an engagement part with which the engagement member 19 as provided in the side of an electronic appliance is engaged, even when rubbed repeatedly by the engagement member 19, a situation such as breakage or separation of the external label 15 can be prevented from occurring. Moreover, by forming a sticking region of the external label 15 which is stuck in the bottom face part 7 of the battery can 2 into a region corresponding to a position of each of the positive electrode terminal part 37 and the negative electrode terminal part 38 of the secondary battery 1, even when the secondary battery 1 is installed in an erroneous direction of an electronic appliance such as the digital still camera 10 or the battery charger 80, since the insulating external label as stuck in the bottom face part 7 of the secondary battery 1 comes into contact with the side of the digital still camera 10 or the battery charger 80 as provided corresponding to the position of each of the positive electrode terminal part 37 and the negative electrode terminal part 38, it is possible to prevent a short circuit due to direct contact of the bottom face part 7 from occurring. In addition, by winding the external label 15 in a region exclusive of a forming region of each of the positive electrode terminal part 37 and the negative electrode terminal part 38 of the battery lid 4, it is possible to enhance the assembling strength between the battery can 2 and the battery lid 4. Accordingly, since it is not required to protrude the engagement convexes 47 as formed on the battery lid 4 which is engaged with the battery can 2 in the upper face side of the battery can 2 from the engagement hole 6, the assembling strength can be ensured without hindering the flatness or appearance of the second battery 1.

In addition, in the secondary battery 1, by making the position of each of the positive electrode terminal part 37 and the negative electrode terminal part 38 which are formed on the battery lid 4 different depending upon a difference in the function such as battery capacity while making the battery can 2 and the battery lid 4 have the same shape, even in the case where the secondary battery 1 of an incompatible type is installed in the incompatible digital still camera 10, conductance does not occur between the electrode terminals so that a trouble can be prevented from occurring.

In addition, in the secondary battery 1, when the battery can 2 and the battery cell 3 are formed in a substantial trapezoidal shape with respect to the cross section thereof in which the edge line of each side of the short sides is formed in a circular arc shape, it is possible to prevent erroneous insertion of the battery cell 3 into the battery can 2 and to effectively utilize a space within the battery can 2. In this way, it is possible to provide a clearance which when the battery cell 3 is heat expanded, becomes a margin between the battery cell 3 and an inner wall of the battery can 2. Accordingly, even in the case where the battery cell 3 is heat expanded, the battery can 2 does not cause distortion, or an excessive load is not applied to the joining part 50 among the positive electrode terminal 21 and the negative electrode terminal 22 and the positive electrode tab 31 and the negative electrode tab 32.

In addition, in the secondary battery 1, the battery lid 4 is configured to have the holder 30 for devising to position and fix the positive electrode tab 31 and the negative electrode tab 32, the substrate 35 provided with the positive electrode terminal part 37 and the negative electrode terminal part 38, and the top cover 36 for sandwiching the substrate 35 together with the holder 30. In this way, in the holder 30, by devising to position the positive electrode tab 31 and the negative electrode tab 32 and holding them, it is positive to easily achieve welding with the positive electrode terminal 21 and the negative electrode terminal 22 or with the positive electrode terminal board 33 and the negative electrode germinal board 34. Also, even in the case where an impact is applied by falling or vibration of the secondary battery 1, or the like, it is possible to prevent a situation that the welded portion between the positive electrode tab 31 and the negative electrode tab 32 comes out.

In addition, in the secondary battery 1, since the battery can 2 is installed on the insertion end face 3*b* of the battery cell 3 through the elastic member 55, not only unsteadiness of the battery cell 3 within the battery can 2 can be prevented, but also an impact due to falling or vibration of the battery can 2, or the like can be absorbed, thereby preventing the impact to apply to the joining part 50. Furthermore, by folding the overlap width 28 along the side face and then inserting the battery cell 3 into the battery can 2, it is possible to make the folded overlap width function as a buffer member between the battery cell 3 and the battery can 2.

In addition, in the secondary battery 1, by sticking the insulating film 56 on the elastic member 55, when the battery cell 3 is inserted into the battery can 2, the insulating film 56 is arranged along the side face of the battery cell 3 while being guided on the side face of the opening 5 of the battery can 2 to cover the aluminum layer 53 of the pack 23 which is exposed on the cut face of the overlap width 28, thereby enabling it to devise to insulate from the inner wall of the battery can 2. Accordingly, even in the case where the metallic battery can 2 is charged, the battery can 2 and the aluminum layer 53 of the pack 23 come in direct contact with each other to become the negative electrode, and it is possible to prevent a phenomenon in which the polypropylene layer 52 has a hole due to some cause, thereby causing electrolytic corrosion, the pack 23 has a hole, and moisture invades from this hole, thereby causing expansion of the battery cell 3.

In addition, in the secondary battery 1, since the insulating paper 51 is stuck to the joining part 50 among the positive electrode terminal 21 and the negative electrode terminal 22 and the positive electrode tab 31 and the negative electrode tab 32, not only it is possible to reinforce the joining part 50, but also it is possible to prevent the generation of a short circuit as caused due to the contact with the metallic battery can 2. Furthermore, by accommodating this joining part 50 into the battery can 2 while being curved in a substantially S-shaped form, even in the case where an impact is applied between the battery cell 3 and the battery lid 4 due to falling or vibration of the secondary battery 1 or the like, the joining part 50 which has been folded in a substantially S-shaped form and accommodated is warped so that a load of the impact is absorbed, thereby preventing the separation of the positive electrode terminal 21 and the negative electrode terminal 22 and the positive electrode tab 31 and the negative electrode tab 32 from occurring.

Incidentally, as described previously, in the secondary battery 1 to which the invention is applied, the battery cell 3 is adhered to the inside of the battery can 2 via the elastic member 55. However, as illustrated in FIGS. 22A to 22C, there may be employed a configuration in which prior to the insertion of the battery cell 3, an adhesive 58 is coated on one principal face within the battery can 2, and the adhesive 58 is spread on the one principal face within the battery can 2 by the battery cell 3 to be inserted into the battery can 2, thereby adhering the battery cell 3 to the battery can 2. By employing such a configuration, the battery cell 3 can be fixed in the battery can 2, thereby preventing unsteadiness of the battery cell 3 within the battery can 2 as caused by falling or vibration of the secondary battery 1 or the like. Accordingly, an excessive load is not applied to the joining part 50 among the positive electrode terminal 21 and the negative electrode terminal 22 and the positive electrode tab 31 and the negative electrode tab 32 so that it is possible to prevent the separation of the positive electrode terminal 21 and the negative electrode terminal 22 and the positive electrode tab 31 and the negative electrode tab 32.

Figure 23:
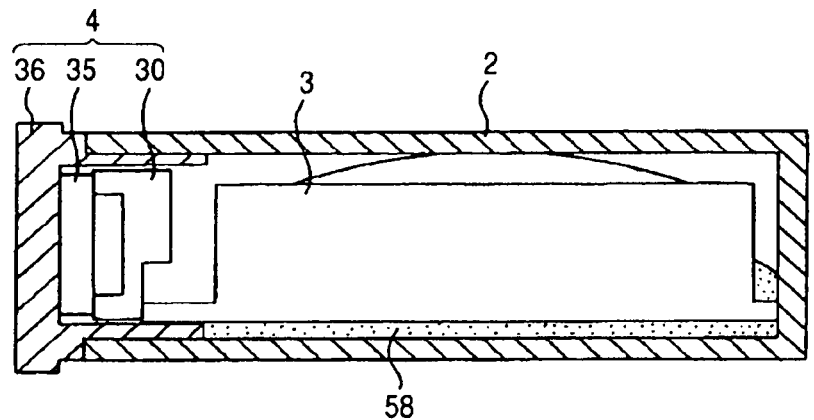
FIG. 23 is a cross-sectional view to show a state of a battery cell which is adhered within a battery can as adhered by an adhesive.

Furthermore, by fixing the battery cell 3 inside the battery can 2 by using the adhesive 58, it is possible to effectively utilize a space within the battery can 2, and it is possible to form a prescribed clearance between the principal face of the battery cell 3 in the opposite side to the adhesive face and an inner wall of the battery can 2 opposing to the foregoing principal face. Accordingly, as illustrated in FIG. 23, even in the case where the battery cell 3 is heat expanded, since a margin against the volume exposition of the battery cell 3 is ensured by the clearance, it is possible to prevent a situation that distortion is generated in the battery can 2 or that an excessive load is applied to the joining part 50.

Figure 24:
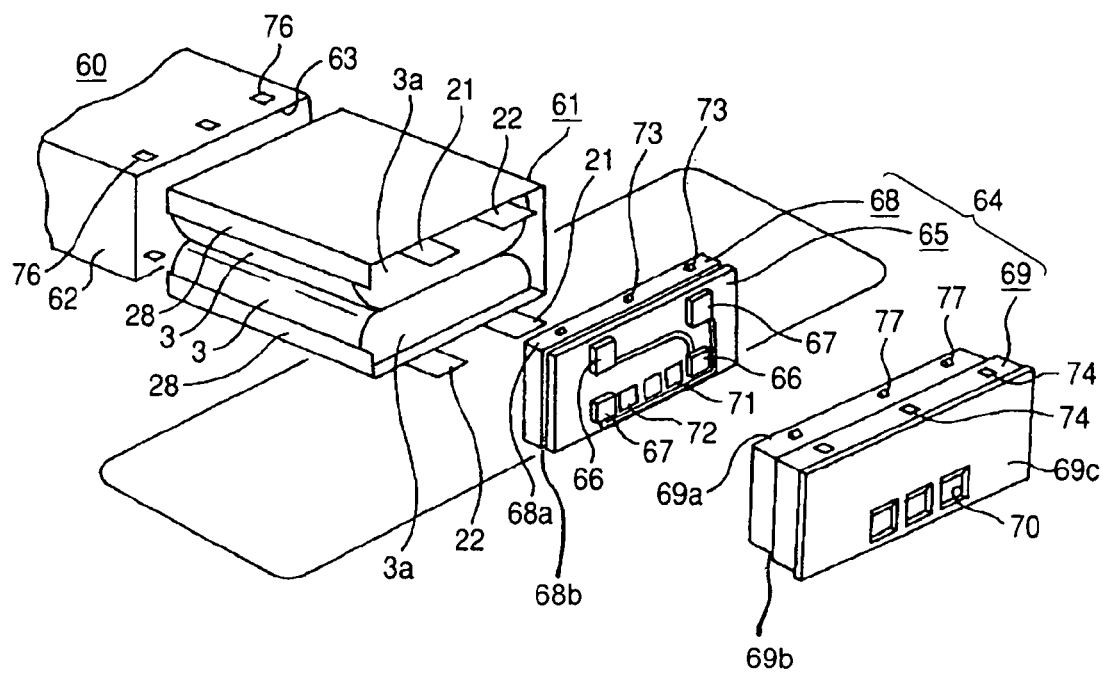
FIG. 24 is an oblique view to show other example of a secondary battery to which the invention is applied.

Furthermore, in the secondary battery to which the invention is applied, there may be employed not only a configuration in which the single battery cell 3 is inserted into the battery can 2 but also a configuration as illustrated in FIG. 24, in which a cell stack 61 having plural battery cells 3 stacked therein is formed and inserted into a single battery can 62. A secondary battery 60 which is configured to accommodate the cell stack 61 therein will be described below. Incidentally, with respect to the same members as in the foregoing secondary battery 1, the same symbols are given, and details thereof are omitted.

In the cell stack 61, plural battery cells 3 are stacked in such a manner that lead-out faces 3a from which a positive electrode terminal 21 and a negative electrode terminal 22 are lead out are faced towards the same direction, and if desired, the respective battery cells 3 may be adhered to each other. In the cell stack 61, the positive electrode terminal 21 and the negative electrode terminal 22 as lead out from each of the battery cells 3 are welded with a positive electrode terminal board 66 and a negative electrode terminal board 67 of a substrate 65 which configures a battery lid 64, respectively.

Figure 25:
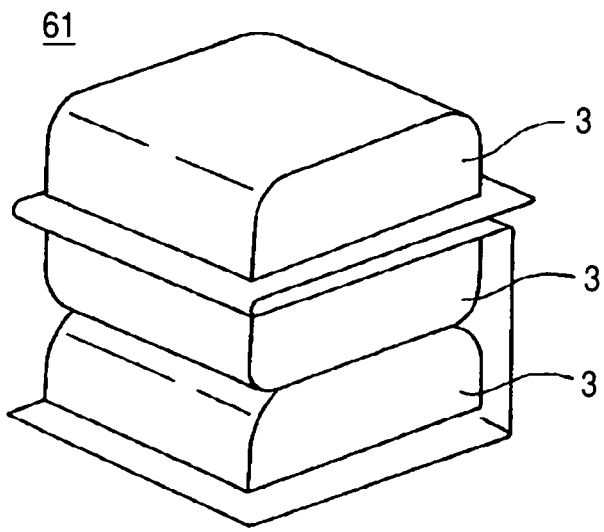
FIG. 25 is an oblique view to show a cell stack.
Figure 26:
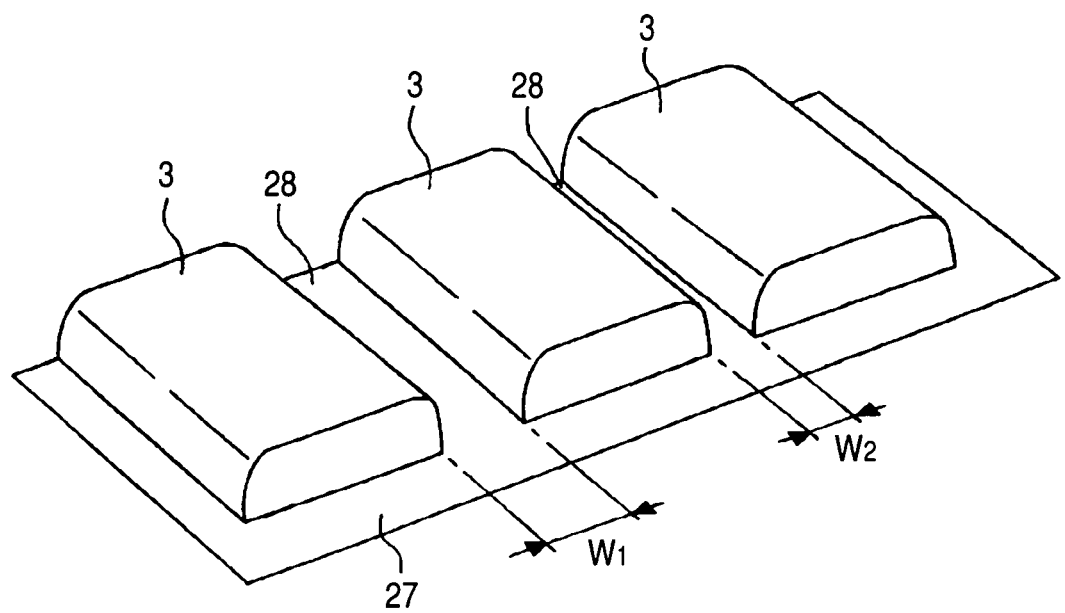
FIG. 26 is an oblique view to show a cell aggregate.

In the cell stack 61, by folding the foregoing cell aggregate 27 along an overlap width 28, the battery cells 3 are stacked. The battery cell 3 may be stacked in two stages as illustrated in FIG. 24 or may be stacked in three stages as illustrate in FIG. 25. In the case where the battery cell 3 is stacked in three stages, as illustrate in FIG. 26, the cell aggregate 27 is formed such that widths $W_1$ and $W_2$ of the overlap widths 28 to be provided between the respective battery cells 3 are made different. In the secondary battery 60, the battery capacity and the voltage can be freely set up by the stacking number of the battery cell 3 and the wiring among the respective battery cells 3.

Incidentally, the cell stack 61 may be formed by individually cutting out the battery cell 3 from the cell aggregate 27 and stacking the battery cells such that the lead-out faces 3a are faced towards the same direction.

In the substrate 65, a positive electrode terminal board 66 and a negative electrode terminal board 67 with which a positive electrode terminal 21 and a negative electrode terminal 22 as lead out from each of the battery cells 3 are welded, and a positive electrode terminal part 71 and a negative electrode terminal part 72 which are connected to the positive electrode terminal board 66 and the negative electrode terminal board 67, respectively by a circuit pattern and which are faced outwardly via a terminal hole 70 as formed on a top cover 69 are formed.

In the secondary battery 60, the stacked battery cells 3 can be set up by a circuit pattern of the substrate 65 such that they are connected in series or in parallel. Such a circuit pattern is formed by an etching process with a copper foil, a printing process with a conductive paste, or the like. Furthermore, the positive electrode terminal board 66 and the negative electrode terminal board 67 are mounted on the land by reflow soldering. The positive electrode terminal part 71 and the negative electrode terminal part 72 are formed on the land as formed in a prescribed place by gilding or the like. Incidentally, likewise the foregoing secondary battery 1, the positive electrode terminal part 71 and the negative electrode terminal part 72 may be arranged in a different position depending upon a difference in every function such as battery capacity of the secondary battery 60. The substrate 65 is sandwiched by a holder 68 and the top cover 69 and configures a battery lid 64 together with the holder 68 and the top cover 69.

The holder 68 is coupled with the top cover 69 via the substrate 65, thereby sandwiching the substrate 65 together with the top cover 69. In this way, the holder 68 receives a pressing pressure which is applied to the positive electrode terminal part 71 and the negative electrode terminal part 72 together with the top cover 69, thereby preventing a situation that an excessive load is applied to the positive electrode terminal part 71 and the negative electrode terminal part 72. This holder 68 is prepared by mold forming a synthetic resin in substantially the same shape as an opening 63 of the battery can 62. Furthermore, in the holder 68, on an upper face 68a and a lower face 68b, plural coupling projections 73 which are engaged in coupling holes 74 as formed on the top cover 69 are intermittently formed.

The top cover 69 which holds the substrate 65 together with the holder 68 is a component which is prepared by mold forming a synthetic resin in substantially the same shape as the opening 63 of the battery can 62 and can be engaged with the opening 63 closely. In the top cover 69, on an upper face 69a and a lower face 69b, plural coupling holes 74 in which the plural coupling projections 73 as projected on the holder 68 are inserted and engaged are intermittently formed corresponding to the coupling projections 73. Furthermore, in the top cover 69, on the upper and lower faces 69a, 69b, plural engagement convexes 77 with which engagement holes 76 as formed in the periphery of the opening 63 of the battery can 62 are engaged are formed. Further, when the top cover 69 is inserted into the battery can 62 from the opening 63 while the upper and lower faces 69a, 69b are slightly warped, the engagement convexes 77 are engaged with the engagement holes 76 and assembled in the battery can 62.

Furthermore, in the top cover 69, terminal holes 70 are projected from the front face 69c such that the positive electrode terminal part 71 and the negative electrode terminal part 72 as formed on the substrate 65 are faced outwardly, and the positive electrode terminal part 71 and the negative electrode terminal part 72 are brought into contact with an electrode terminal in the side of an electronic appliance such as the digital still camera 10 or the battery charge 80 through the terminal holes 70.

In the top cover 69, after connecting the positive electrode terminal 21 and the negative electrode terminal 22 of the battery cell 3 to the positive electrode terminal board 66 and the negative electrode terminal board 67 of the substrate 65, respectively, by inserting the coupling projections 73 of the holder 68 into the coupling holes 74, the tope cover 69 is coupled with the holder 68 while sandwiching the substrate 65, thereby forming the battery lid 64. Thereafter, when the engagement convexes 77 of the top cover 69 are engaged with the engagement holes 76 as formed in the periphery of the opening 63 of the battery can 62, the battery lid 64 is assembled in the battery can 62, thereby forming the secondary battery 60.

The battery can 62 into which the cell stack 61 is inserted is made of a metallic casing in which one face of a substantially flat cube is opened and is formed in a substantially rectangular shape with respect to the cross section thereof depending upon the shape of the cell stack 61. In the battery scan 62, the opening 63 for inserting the cell stack 61 is formed only on one face by molding a metallic material such as iron by deep drawing. By regulating a wall thickness at approximately 0.3 mm, this battery can 62 is formed in a slim shape such that when an accommodating region of the battery cell 3 is eliminated, its own thickness is controlled to the utmost; and at the same time, by using the metallic material, the battery can 62 can be provided with mechanical strengths against various impacts such as falling, and vibration. The opening 63 is an insertion end from which the cell stack 61 is inserted and after insertion of the cell stack 61, is plugged by the battery lid 64. For that reason, plural engagement holes 76 with which engagement convexes 77 as projected on the battery lid 64 are perforated in the periphery of the opening 63. In the engagement holes 76, when the battery lid 64 is inserted into the opening 63, the engagement convexes 77 as projected on the battery lid 64 invade into the opening 63 while being warped and are then engaged with the engagement holes 76. In this way, the battery lid 64 is assembled in the battery can 62.

Incidentally, likewise the foregoing secondary battery 1, in the battery can 62, in the case where it is externally attached in a battery installing part of an electronic appliance in the bottom face part opposing to the opening 63 or in the case where it is installed in the battery installing part of the battery charger 80, engagement holes which are engaged with engagement convexes as projected in the battery installing part may be formed. Furthermore, engagement concaves may be provided in the battery installing part, and engagement convexes may be formed in the bottom face part of the battery can 62. Similarly, likewise the foregoing secondary battery 1, in the top cover 69, in the case where it is externally attached in a battery installing part of an electronic appliance in a prescribed place of a front face 69c or in the case where it is installed in the battery installing part of the battery charger 80, concave engagement parts which are engaged with engagement convexes as protected in the battery installing part may be formed. Furthermore, engagement concaves may be provided in the battery installing part, and convex engagement parts may be formed in the front face 69c of the top cover 69.

Incidentally, in the battery can 62, likewise the foregoing secondary battery 1, after connecting it to the battery lid 64, inserting the cell stack 61 and plugging the opening 63 by the battery lid 64, an insulating external label 15 and an information label 49 in which a variety of information of the secondary battery 60 is described are stuck. The configuration and effect of the external label 15 are the same as in the case where it is stuck to the foregoing secondary battery 1.

Figure 27:
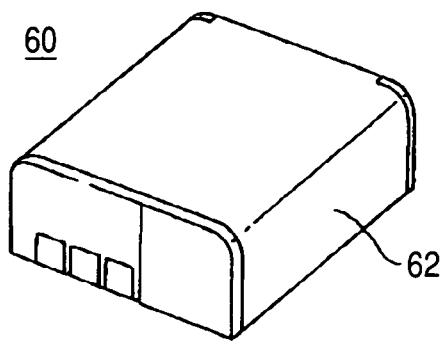
FIG. 27 is an oblique view to show a secondary battery to which the invention is applied.

Furthermore, the battery can 62 may be formed in a substantially trapezoidal shape with respect to the cross section thereof in which the edge line in the direction of short sides is formed in a circular arc shape as illustrate in FIG. 27, in addition to the case where the battery can 62 is formed in a substantially rectangular shape with respect to the cross section thereof. By taking such a shape, the secondary battery 60 can be prevented from erroneous insertion into the battery installing part of an electronic appliance such as the digital still camera 10 or the battery charger 80.

Figure 28:
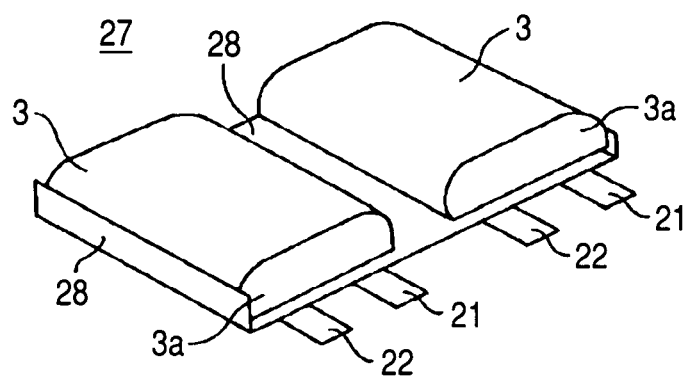
FIG. 28 is an oblique view to show a cell aggregate in which an overlap width is folded.

The foregoing secondary battery 60 is manufactured as follows. First of all, as illustrated in FIG. 28, the cell aggregate 27 is cut in such a manner that two or more of battery cells 3 are continued depending upon the stacking number of the battery cell 3 and folded along the overlap width 28 so as to stack the battery cells 3, thereby forming the cell stack 61.

Figure 29:
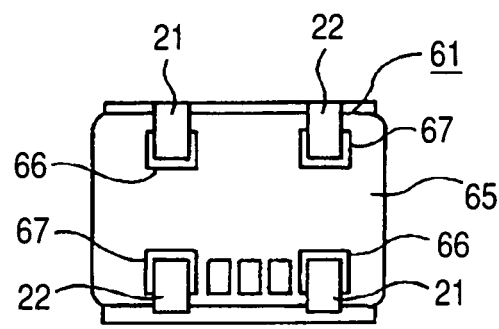
FIG. 29 is a front view to show a substrate in which positive and negative electrode terminals as lead out from a cell stack are welded.

Next, as illustrated in FIG. 29, the positive electrode terminal 21 and the negative electrode terminal 22 which are lead out from each of the battery cells 3 of the cell stack 61 are welded with the positive electrode terminal board 66 and the negative electrode terminal board 67 as mounted on the substrate 65. Incidentally, in the substrate 65, the circuit pattern for connecting the respective battery cells 3 in series or in parallel and the positive electrode terminal part 71 and the negative electrode terminal part 72 are formed in advance in a separate process, and the positive electrode terminal beard 71 and the negative electrode terminal board 72 are mounted; and the substrate 65 is supported by the holder 68.

Next, the holder 68 and the top cover 69 are coupled with each other to form the battery lid 64, and the cell stack 61 is subsequently inserted into the opening 63 of the battery can 62. At this time, in the cell stack 61, by sticking the elastic member 55 having the insulating film 56 provided therein to the insertion end face 3b of each of the battery cells 3, the pack 23 may devise to achieve insulation from the inner wall of the battery can 62 by the insulating film 56 at the same time of inserting the battery can 62 or may be fixed to the battery can 62 by the elastic member 55.

Subsequent to the insertion of the cell stack 61, the battery lid 64 is assembled in the opening 63 of the battery can 62. Thereafter, the external label 15 is stuck to the battery can 62. As described previously, the external label 15 becomes a decorative label of the secondary battery 60 and also devises to achieve insulation of the metallic battery can 62. Furthermore, the external label 15 is provided with the principal face part 16 for winding the outer periphery of the battery can 62, the first winding part 17 for winding a region exclusive of the both end parts in a longitudinal direction of the bottom face part of the battery can 62, and the second winding part 18 for winding a region exclusive of the terminal hole 70 as formed in the top cover 69 of the battery lid 64.

In this way, in the secondary battery 60, the both ends in the bottom face part of the battery can 62 become an engagement part with which the engagement member as provided in the battery accommodating part of an electronic appliance. Also, when the external label 15 is stuck so as to wind even the battery lid 64, it is possible to ensure an assembling strength between the battery lid 64 and the battery can 62 without hindering the flatness and appearance.

According to the thus configured secondary battery 60, by using the cell stack 61 having plural battery cells 3 stacked therein as the need arises, it is possible to easily obtain a secondary battery with high battery capacity or a secondary battery with long life. Furthermore, in the secondary battery 60, since the respective battery cells 3 can be connected in series or in parallel depending upon the circuit pattern as formed on the substrate, it is possible to devise to achieve high capacity or long life with ease.

Next, the battery charger 80 for charging the foregoing secondary battery will be described below. The battery charger 80 is used as a battery charger which is common in plural kinds of secondary batteries 1 which are equal in the outer shape but are different in a point that the positive electrode terminal part 37 and the negative electrode terminal part 38 which are faced from the front face 1*c* are arranged in a position of substantial point symmetry depending upon a difference in a battery capacity or a compatible electronic appliance, the presence or absence of a residual battery life display function, or a difference between a type which is able to achieve quick recharge and a type which is not able to achieve quick recharge.

As illustrated in FIG. 30, the battery charger 80 has a battery charge main body 81, a battery accommodating part 82 in which the secondary battery 1 is accommodated, an electrode terminal which is arranged within the battery accommodating part 82 and which is brought into contact with the positive electrode terminal part 37 and the negative electrode terminal part 38 of the secondary battery 1, and a transparent part 84 in which the electrode terminal 83 can be viewed from the outside of the battery charger main body 81.

As illustrated in FIG. 30, the battery charger main body 81 is, for example, made of a cube larger than the secondary battery 1, and the battery accommodating part 82 is formed in a principal face part 81*a*. The battery accommodating part 82 is a concave having substantially the same size as the secondary battery 1; and the electrode terminal 83 is formed in one side wall part 82*a* corresponding to the position of the positive electrode terminal part 37 and the negative electrode terminal part 38 which are faced outwardly from the terminal holes 48 as provided in the front face 1*c* of the secondary battery 1. Furthermore, in the battery charger main body 81, the transparent part 84 capable of enhancing the visibility of the electrode terminal 83 is formed from a side wall part 82*a* in which the electrode terminal 83 is formed to the principal face part 81*a*. By providing the transparent part 84, a user of the battery charger 80 can easily view the position of the electrode terminal 83 from the upper side. Furthermore, in installing the secondary battery 1 in the battery accommodating part 82, it is possible to easily confirm that the positive electrode terminal part 37 and the negative electrode terminal part 38 in the side of the secondary battery 1 are connected to the electrode terminal 83 in the side of the battery charger main body 81 without making a mistake on the insertion direction. Besides, the battery charger main body 81 is provided with a cord for taking in an external power source, a display part for displaying the charging state by an LED element or a liquid crystal, and so on, details of which are, however, omitted.

Here, as described previously, the secondary battery 1 which is installed in the battery charger 80 is formed in such a manner that the arrangement of the positive electrode terminal part 37 and the negative electrode terminal part 38 is made different depending upon the function, for example, whether or not it is of a high battery capacity type, whether or not a residual battery life display function by LED, a liquid crystal, or the like is provided, a difference of a compatible electronic appliance, or whether or not quick recharge is possible. That is, while the outer shape of the battery can 2 and the battery lid 4 which configure the secondary battery 1 is the same regardless of a difference of the function, the positive electrode terminal part 37 and the negative electrode terminal part 38 which are formed in the substrate 35, which configure the battery lid 4, are arranged in a position of substantial point symmetry depending upon the foregoing every function. Similarly, the electrode terminal which is provided in the side of an electronic appliance takes an arrangement corresponding to the arrangement of the positive electrode terminal part 37 and the negative electrode terminal 38 of the corresponding secondary battery. In this way, even in the case where the secondary battery 1 is installed in an incompatible electronic appliance, since the positive electrode terminal part 37 and the negative electrode terminal part 38 in the side of the secondary battery 1 do not come into contact with the electrode terminal as provided in the side of the electronic appliance, it is possible to prevent a trouble as caused due to erroneous installation. Incidentally, at this time, since the electrode terminal in the side of the electronic appliance comes into contact with the front face 36*c* of the top cover 36 made of a synthetic resin, it is prevented from the occurrence of direct contact with the metallic battery can 2.

On the other hand, what plural battery chargers are prepared for every function even at the time of charging the secondary battery 1 requires a user to use a battery charger for each purpose and is complicated. Furthermore, this also requires a product supplier to manufacture and manage plural kinds of battery chargers so that it is complicated.

Figure 31:
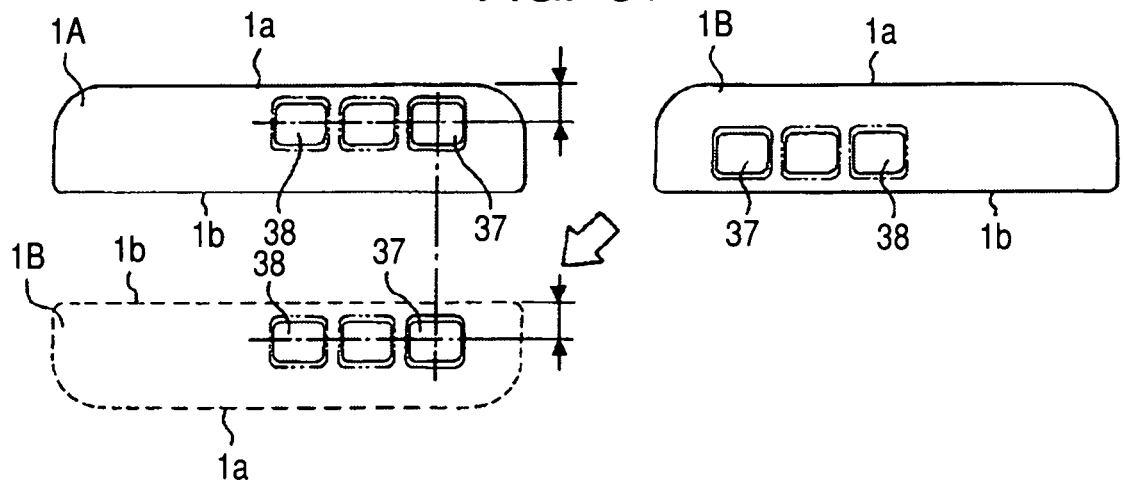
FIG. 31 is a front view to show a secondary battery which is installed in the foregoing battery charger.

Then, in the present battery charger 80, with respect to plural secondary batteries 1 having a different position of the positive electrode terminal part 37 and the negative electrode terminal part 38 for every function, change of the installation direction makes it possible to achieve common use. Concretely, in the secondary battery 1, since the positive electrode terminal part 37 and the negative electrode terminal part 38 are arranged in a position of substantial point symmetry for every function, as illustrate in FIG. 31, when a secondary battery 1B in which the positive electrode terminal part 37 and the negative electrode terminal part 38 are arranged in a position of substantial point symmetry is rotated through 180 degrees against a secondary battery 1A, the positive electrode terminal part 37 and the negative electrode terminal part 38 of the both become the same positions. Accordingly, in the case where the secondary battery 1A is installed in the battery charge 80, an upper face 1*a* in the side of the short side is positioned upwardly; and in the case where the secondary battery 1B is installed in the battery charger 80, it is rotated through 180 degrees such that a lower face 1*b* is positioned downwardly. In this way, in all of the secondary batteries 1A, 1B, charging can be carried out by bringing the positive electrode terminal part 37 and the negative electrode terminal part 38 into contact with the electrode terminal 83 as formed in the side of the battery charger 80.

Incidentally, it is possible to easily confirm whether or not each of the positive electrode terminal part 37 and the negative electrode terminal part 38 comes into contact with the electrode terminal 83 of the battery charger 81 through the transparent part 84 regardless of the installation direction regarding the secondary batteries 1A, 1B. Also, the correctness of the installation direction regarding the secondary batteries 1A, 1B can be confirmed by a display part for displaying the charging state or the like.

Here, in the case where the secondary battery 1A is installed in such a manner that the lower face 1*b* is faced upwardly and the secondary battery 1B is installed in such a manner that the upper face 1*a* is faced upwardly, since each of the positive electrode terminal part 37 and the negative electrode terminal part 38 does not come into contact with the electrode terminal 83, charging is not achieved. At this time, since the electrode terminal 83 comes into contact with the front face 36c of the top cover 36 made of a synthetic resin, it is prevented from the occurrence of direct contact with the metallic battery can 2. Furthermore, even in the case where the secondary batteries 1A, 1B are installed in such a manner that the front face 1a and the back face 1d are reversed, since the electrode terminal 83 comes into contact with the back face 1d of the secondary battery 1, charging is not achieved. At this time, since the electrode terminal 83 is brought into contact with the first winding part 17 of the external label 15 as stuck on the bottom face of the battery can 2, it is prevented from the occurrence of direct contact with the metallic battery can 2.

Figure 32:
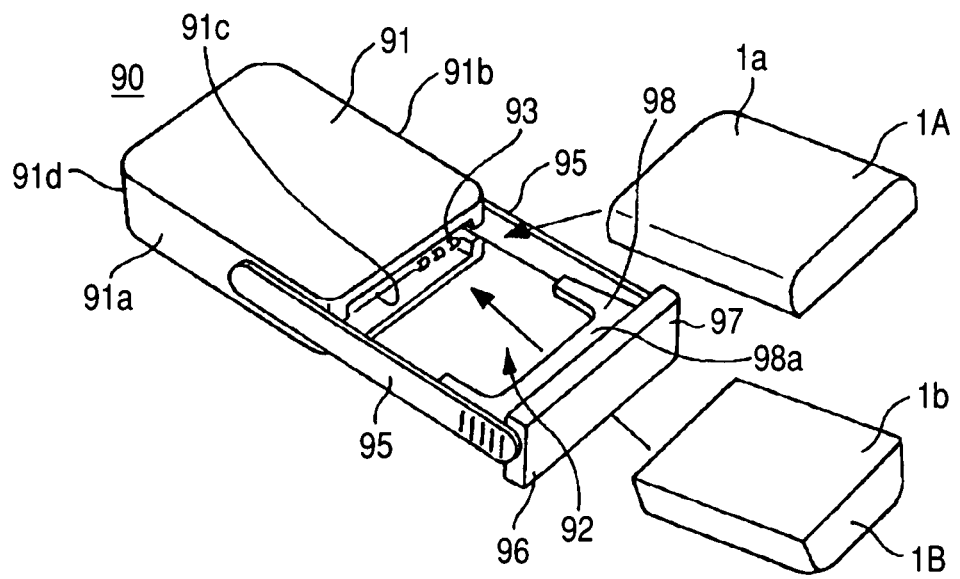
FIG. 32 is an oblique view to show other example of a battery charger for a secondary battery to which the invention is applied.

Furthermore, such a compatible battery charger may be configured as follows. As illustrated in FIG. 32, a battery charger 90 is provided with a battery charger main body 91 in a substantially rectangular shape, a holding arm 92 which is slidably supported by side faces 91a, 91b of the battery charger main body 91 opposing to each other and which supports the secondary battery 1, and an electrode terminal 93 as provided on a front face 91c of the battery charger main body 91. In this battery charger 90, the secondary battery 1A or 1B in which the positive electrode terminal part 37 and the negative electrode terminal part 38 are arranged in a position of substantial point symmetry is installed from one direction or the other direction of the holding arm 92 which holds the secondary battery 1.

The holding arm 92 is provided with one pair of arm parts 95, 95 which are slidably supported by the both side faces 91a, 91b of the battery charger main body 91 and a holding part 96 which is provided over one pair of the arm parts 95, 95 in tip parts of the arm parts 95, 95 and which holds the secondary battery 1A or 1B.

The arm parts 95, 95 are a longitudinal member and when slidably supported by the both side faces 91a, 91b of the battery charger main body 91 at an interval substantially equal to the width of the secondary battery 1, is drawn out into the side of the front face 91c of the battery charger main body 91. The holding part 96 which is formed in the tip parts of the arm parts 95, 95 is a member in a substantially T-shaped form which supports the battery can 2 of the secondary battery 1 and has a supporting wall 97 which configures a front face of the battery charger main body 91 and which supports the bottom face part of the battery can 2 and a placing face part 98 which projects from substantially the center in the height direction of the supporting wall 97 towards the side of the front face 91c of the battery charger main body 91 over the arm parts 95, 95 and in which the both faces thereof are placing faces 98a, 98b on which a rear end part of the battery can 2 is placed.

When the arm parts 95, 95 are slid in the side of the back face 91d of the battery charger main body 91, the supporting wall 97 becomes a front face of the battery charger main body 91. Furthermore, when the arm parts 95, 95 are slid in the side of the front face 91c of the battery charger main body 91 and the secondary battery 1 is installed in the supporting arm 92, the supporting wall 97 supports the bottom face part 7 of the battery can 2.

In the placing face part 98, in the direction from the supporting wall 97 to the side of the front face 91c of the battery charger main body 91, the placing faces 98a, 98b are each an inclination face as inclined towards the center in the thickness direction of the front face 91c. Further, in installing the secondary battery 1 in the holding arm 92, the rear end part of the battery can 2 is placed, and the placing face part 98 is inclined in such a manner that the front face 36c of the top cover 36 from which the positive electrode terminal part 37 and the negative electrode terminal part 38 are faced is able to come into contact with the electrode terminal 93 as formed on the front face 91c of the battery charger main body 91. That is, when the rear end part of the battery can 2 is placed on the both placing faces 98a, 98b of the placing face part 98, the positive electrode terminal part 37 and the negative electrode terminal part 38 are brought into contact with the electrode terminal 93 of the battery charger main body 91.

The holding arm 92 holds the secondary battery 1 by one pair of the arm parts 95, 95, the placing face 98a or placing face 98b, and the supporting wall 97. At this time, as illustrated in FIGS. 33A and 33B, the holding arm 92 holds the secondary battery 1A in which the positive electrode terminal part 37 and the negative electrode terminal part 38 are arranged in a position of substantial point symmetry each on the placing face 98a and the secondary battery 1B on the placing face 98b, respectively depending upon the function. At this time, each of the secondary batteries 1A, 1B is installed in the holding arm 92 in such a manner that each lower face 1b is an insertion face. Furthermore, the secondary battery 1A which is held on the placing face 98a and the secondary battery 1B which is held on the placing face 98b are installed while being rotated through 180 degrees each other. In this way, in all of the secondary batteries 1A, 1B, since the positive electrode terminal part 37 and the negative electrode terminal part 38 are turned to the same position, they come into contact with the electrode terminal 93 as formed in the side of the front face 91c of the battery charger main body 91, whereby charging can be achieved.

Incidentally, in the case where the secondary batteries 1A, 1B are installed from the side of the upper face 1a while reversing the insertion face, in the case where the secondary battery 1A is installed in the side of the placing face 98b, or in the case where the secondary battery 1B is installed in the side of the placing face 98a, since the positive electrode terminal part 37 and the negative electrode terminal part 38 do not come into contact with the electrode terminal 93 as formed on the front face 91c of the battery charge main body 91, charging is not achieved. At this time, since the electrode terminal 93 comes into contact with the front 36c of the top cover 36 made of a synthetic resin, it is prevented from the occurrence of direct contact with the metallic battery can 2. Also, in the case where the secondary batteries 1A, 1B are installed while reversing the upper faces 1a and the back faces 1d, they are not charged because the electrode terminal 93 comes in contact with the back faces 1d of the secondary batteries 1A and 1B. In this case, the electrode terminal 93 is prevented from coming in direct contact with the battery can 2 made of a metal because the electrode terminal 93 comes in contact with the first winding part 17 of the external label 15 stuck on the bottom face of the battery can 2.

Figure 34:
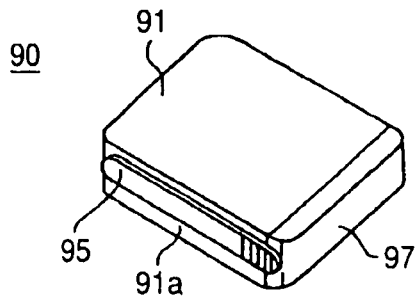
FIG. 34 is an oblique view to show the foregoing battery charger in which a holding arm is accommodated.

Furthermore, as illustrated in FIG. 34, since at the time of non-use, the arm parts 95, 95 can be slid in the side of the back face 91d of the battery charger main body 91, the battery charger 90 is excellent in portable properties and is able to prevent the breakage of the arm parts 95, 95 or the like.

Figure 35:
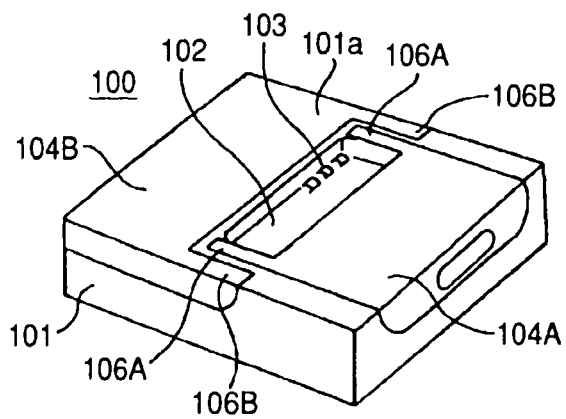
FIG. 35 is an oblique view to show other example of a battery charger for a secondary battery to which the invention is applied.

Furthermore, such a compatible battery charger may be configured as follows. As illustrated in FIG. 35, a battery charger 100 is provided with a battery charger main body 101 in a substantially rectangular shape, a battery installing part 102 as provided on an upper face 101a of the battery charger main body 101, an electrode terminal 103 which is formed within the battery installing part 102 and which comes into contact with the positive electrode terminal part 37 and the negative electrode terminal part 38 of the secondary battery 1, and one pair of battery holders 104A, 104B which are rotatably provided on the upper face 101a of the battery charger main body 101 and which hold the secondary batteries 1A, 1B. In this battery charger 100, by installing in the battery holder 104A or 104B by altering the direction of the secondary battery 1 depending upon the arrangement of the positive electrode terminal part 37 and the negative electrode terminal part 38, thereby enabling the electrode terminal 103 of the battery installing part 102 to come into contact with the positive electrode terminal part 37 and the negative electrode terminal part 38, not only compatibility of plural kinds of secondary batteries 1A, 1B is ensured, but also in the case where the direction is improper, insertion in the battery holder 104A or 104B is inhibited. Thus, erroneous installation of the secondary batteries 1A, 1B is prevented.

The battery charge main body 101 is formed in a substantially rectangular box-like shape, and the battery installing part 102 in which the secondary battery 1 is installed from the side of the front face 1c is formed in substantially the center of the upper face 101a. Furthermore, in the battery charger main body 101, one pair of the battery holders 104A, 104B are provided rotatably towards the upper direction on the upper face 101a.

The battery installing part 102 is a concave in which the secondary battery 1 is installed from the side of the front face and is opened in a substantially rectangular shape depending upon the shape of the secondary battery 1. In the bottom face part of the battery installing part 102, the electrode terminal 103 which comes into contact with the positive electrode terminal part 37 and the negative electrode terminal part 38 which are faced from the front face 1c of the secondary battery 1 is formed.

Figure 36A:
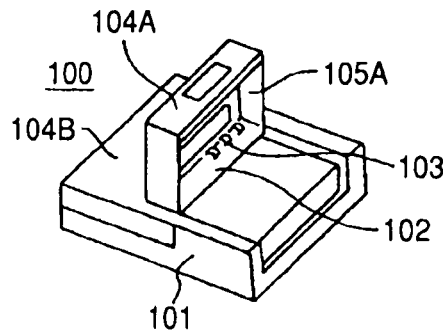
FIGS. 36A and 36B are oblique views to show the foregoing battery charger in which a secondary battery is installed.
Figure 36B:
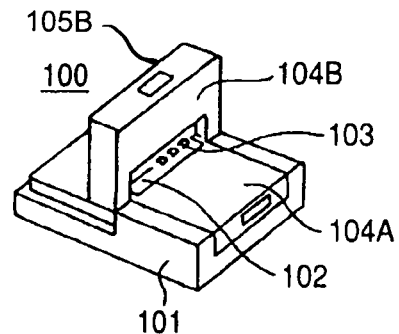
Figure 37:
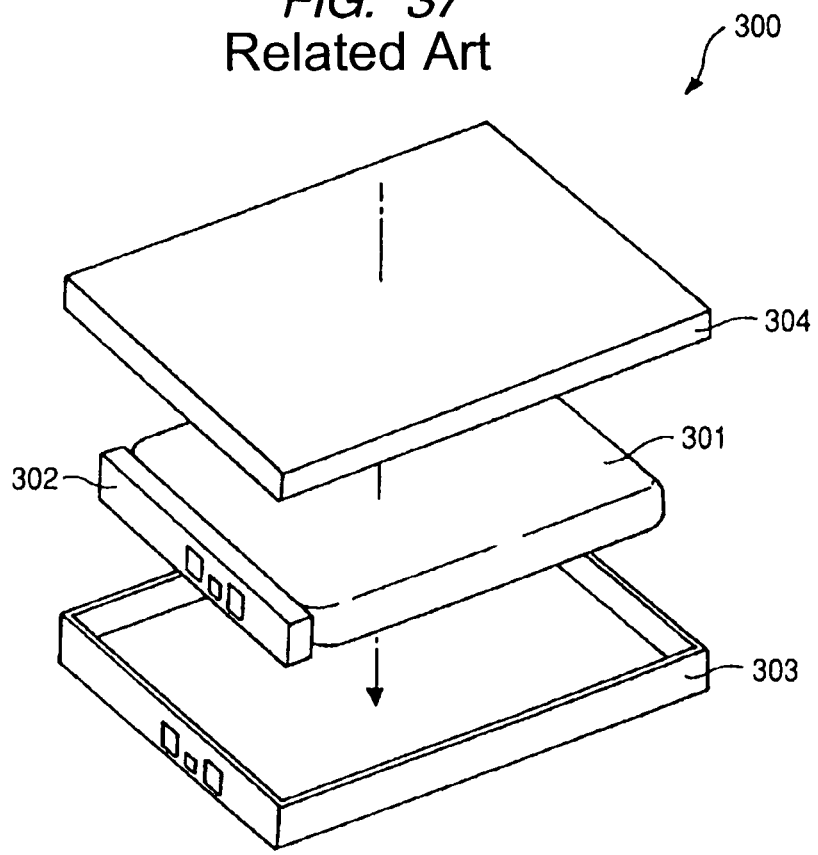
FIG. 37 is an oblique view to show a related-art polymer lithium ion secondary battery.

The battery holders 104A, 104B hold the secondary batteries 1A, 1B which are installed in the battery installing part 102, and the battery holder 104A holds the secondary battery 1A as illustrated in FIG. 36A, and the battery holder 104B holds the secondary battery 1B as illustrated in FIG. 36B, respectively. The battery holders 104A, 104B have battery accommodating parts 105A, 105B for accommodating the secondary battery 1 therein and one pair of arm parts 106A, 106B which are continuously projected and formed from one pair of side faces of each of the battery accommodating parts 105A, 105B and which are rotatably supported by the battery charger main body 101, respectively. Further, the battery holder 104A is formed such that the battery accommodating part 105A is rotable towards the upper direction from the side of the front face of the upper face 101a of the battery charger main body 101 while using the base end parts of one pair of the arm parts 106A as a rotation fulcrum; and the battery holder 104B is formed such that it is rotatable towards the upper direction from the side of the back face of the upper face 101a of the battery charger main body 101 while using the base end parts of one pair of the arm parts 106B as a rotation fulcrum.

The battery holders 104A, 104B are installed in such a manner that when the battery accommodating part 105A and the battery accommodating part 105B are rotated upwards the battery charger main body 101, the opening sides of the respective principal faces are faced opposite to each other. That is, in the battery accommodating parts 105A, 105B, when installed on the upper face 101a of the battery charger main body 101, each of the back face walls thereof is faced upwardly as illustrated in FIG. 35; and when rotated upwardly, in the battery holder 104A, the back face wall of the battery accommodating part 105A is faced in the side of the back face of the battery charger main body 101 as illustrated in FIG. 36A, whereas in the battery holder 104B, the back face wall of the battery accommodating part 105B is faced in the side of the front face of the battery charger main body 101 as illustrated in FIG. 36B. In this way, the secondary battery 1A which is installed in the battery holder 104A and the secondary battery 1B which is installed in the battery holder 104B are installed in an opposite direction to each other with respect to the battery installing part 102 as provided on the upper face 101a of the battery charger main body 101.

One pair of the arm parts 106A, 106B are rotatably supported while sandwiching the battery installing part 102 of the battery charger main body 101 therebetween; and when rotated in the side of the front face or in the side of back face of the battery charger main body 101, they hold the battery holders 104, 104B substantially flush with the upper face 101a, whereas when rotated upwardly, they raise up the battery holders 104A, 104B, thereby enabling the secondary battery 1 to be installed therein.

In one pair of the arm parts 106A, 106B, the respective base end parts are supported while sandwiching both end parts in the longitudinal direction of the battery installing part 102 as provided on the upper face 101a of the battery charger main body 101. Furthermore, since the battery holder 104A is formed so as to have a width narrower than the battery holder 104B, the base end part of the arm part 106A is supported in the battery charger main body 101 more inwardly than the base end part of the arm part 106B. In this way, in the battery holder 104A and the battery holder 105B, when either one of them is rotated upwardly, the rotation of the other is inhibited. Thus, only one of the secondary battery 1A or the secondary battery 1B always comes into contact with the electrode terminal 103.

In charging the secondary batteries 1A, 1B in which the positive electrode terminal part 37 and the negative electrode terminal part 38 are arranged in a position of substantial point symmetry for every function by using the foregoing battery charger 100, either one of the battery holder 104A or 104B is rotated upwardly depending upon the position of the terminal of the secondary battery 1. In the case where the battery holder 104A is rotated upwardly (see FIG. 36A), the secondary battery 1A is inserted into the battery accommodating part 105A in such a manner that the lower face 1b is the insertion end face. In this way, in the secondary battery 1A, the side of the front face 1c is installed in the battery installing part 102, and the positive electrode terminal part 37 and the negative electrode terminal part 38 come into contact with the electrode terminal 103, thereby achieving charging.

Incidentally, in the case where it is intended to insert the secondary battery 1A from the side of the upper face 1a, the insertion into the battery accommodating part 105A is inhibited. Furthermore, in the case where the secondary battery 1B is inserted into the battery holder 104A, since the position of the positive electrode terminal part 37 and the negative electrode terminal part 38 is formed opposite such that it is rotated through 180 degrees, the positive electrode terminal part 37 and the negative electrode terminal part 38 do not come into contact with the electrode terminal 103 of the battery installing part 102, whereby charging is not achieved. At this time, since the electrode terminal 103 comes into contact with the front face 36c of the top cover 36 made of a synthetic resin, it is prevented from the occurrence of direct contact with the metallic battery can 2. Furthermore, in the case where the secondary battery 1A is inserted inverted, since the electrode terminal 103 comes into contact with the back side 1d of the secondary battery 1, charging is not achieved. At this time, since the electrode terminal 103 comes into contact with the first winding part 17 of the external label 15 as stuck in the bottom face part 7 of the battery can 2, it is prevented from the occurrence of direct contact with the metallic battery can 2.

Furthermore, in the case where the battery holder 104B is rotated upwardly (see FIG. 36B), the secondary battery 1B is inserted into the battery accommodating part 105B in such a manner that the lower face 1b is the insertion end face. In this way, in the secondary battery 1B, the side of the front face 1c is installed in the battery installing part 102. Here, since the positive electrode terminal part 37 and the negative electrode terminal part 38 are formed in a position of substantial point symmetry against the secondary battery 1A, when the secondary battery 1B is inserted into the battery accommodating part 105B in a reverse direction to the secondary battery 1A as inserted into the battery accommodating part 105A, the positive electrode terminal part 37 and the negative electrode terminal part 38 turn to the same positions as in the secondary battery 1A with respect to the electrode terminal 103 of the battery installing part 102. Accordingly, in the secondary battery 1B, the positive electrode terminal part 37 and the negative electrode terminal part 38 come into contact with the electrode terminal 103, thereby achieving charging.

Incidentally, in the case where it is intended to insert the secondary battery 1B from the side of the upper face 1a, the insertion into the battery accommodating part 105B is inhibited. Furthermore, in the case where the secondary battery 1A is inserted into the battery holder 104B, since the position of the positive electrode terminal part 37 and the negative electrode terminal part 38 is formed opposite such that it is rotated through 180 degrees, the positive electrode terminal part 37 and the negative electrode terminal part 38 do not come into contact with the electrode terminal 103 of the battery installing part 102, whereby charging is not achieved. At this time, since the electrode terminal 103 comes into contact with the front face 36c of the top cover 36 made of a synthetic resin, it is prevented from the occurrence of direct contact with the metallic battery can 2. Furthermore, in the case where the secondary battery 1B is inserted inverted, since the electrode terminal 103 comes into contact with the back side 1d of the secondary battery 1, charging is not achieved. At this time, since the electrode terminal 103 comes into contact with the first winding part 17 of the external label 15 as stuck in the bottom face part 7 of the battery can 2, it is prevented from the occurrence of direct contact with the metallic battery can 2.

In the light of the above, in all of the secondary batteries 1A, 1B, since the positive electrode terminal part 37 and the negative electrode terminal part 38 turn to the same positions, the positive electrode terminal part 37 and the negative electrode terminal part 38 come into contact with the electrode terminal 103 as formed in the battery installing part 102, thereby achieving charging. Thus, it is possible to commonly use the battery charger 100.

Furthermore, in the battery charger 90, since at the time of non-use, the battery holder 104 can be rotated in the side of the upper side 101a of the battery charger main body 101, the battery charger 90 is excellent in portable properties and is able to prevent the breakage of the battery holder 104.

It should be understood by those skilled in the art that various modifications, combinations, sub-combinations and alternations may occur depending on design requirements and other factors insofar as they are within the scope of the appended claims or the equivalents thereof.

What is claimed is:

1. A secondary battery for an electronic appliance, comprising:

a battery cell including a positive electrode, a negative electrode, and an electrolyte in a pack, a positive electrode terminal and a negative electrode terminal from the positive electrode and the negative electrode, respectively, being each led out from a first side face of the battery cell;

a battery cell holder including an opening, a bottom face part, and two opposing longitudinal faces, the bottom face part being smaller than both of the opposing longitudinal faces, the battery cell being inserted into the opening, and the battery cell holder accommodating the battery cell therein such that the first side face of the battery cell is faced towards the opening; and a lid including terminal parts configured to be connected to the positive and negative electrodes upon being connected to the positive electrode terminal and the negative electrode terminal and being faced outwardly, the lid plugging the opening of the battery cell holder, wherein a cross section of an entirety of the secondary battery has a substantially trapezoidal flat plate shape including a long edge, a short edge that is shorter than the long edge, and opposing adjoining sides, which adjoin the long edge and the short edge, and wherein the positive electrode terminal and the negative electrode terminal are faced outwardly and are disposed closer to the short edge of the trapezoidal shape than to the long edge.

2. The secondary battery according to claim 1, wherein the battery cell is inserted such that each long side of the battery cell and each short side of the battery cell corresponds to a long side of the battery cell holder and a short side of the battery cell holder, respectively.

3. The secondary battery according to claim 1, wherein a clearance exists between the battery cell and an inner periphery of the battery cell holder.

4. The secondary battery according to claim 1, wherein a second side face of the battery cell abuts the bottom face part of the battery cell holder, the bottom face part of the battery cell holder being opposite to the opening of the battery cell holder, the second side face being a non-planar surface and being adhered to the bottom face part of the battery cell holder via an elastic member including a pressure-sensitive foam, wherein the elastic member extends longitudinally along the bottom face part of the battery cell holder, and wherein an insulating film strip is arranged at each end of the elastic member, each insulating film strip extending from the elastic member on the second side face of the battery cell and wrapping around to cover a longitudinal side face of the battery cell so as to be disposed between a cut face of the pack and an inner wall of the battery cell holder.

5. The secondary battery according to claim 1, wherein a principal face of the battery cell is adhered to a principal face of the battery cell holder by an adhesive disposed on the principal face of the battery cell holder.

6. The secondary battery according to claim 1, wherein an overlap width part of the pack is folded along an outside face of the pack.

7. The secondary battery according to claim 2, wherein a second side face of the battery cell abuts the bottom face part of the battery cell holder, the bottom face part of the battery cell holder being opposite to the opening of the battery cell holder, the second side face being a non-planar surface and being adhered to the bottom face part of the battery cell holder via an elastic member including a pressure-sensitive foam, wherein the elastic member extends longitudinally along the bottom face part of the battery cell holder, and wherein an insulating film strip is arranged at each end of the elastic member, each insulating film strip extending from the elastic member on the second side face of the battery cell and wrapping around to cover a longitudinal side face of the battery cell so as to be disposed between a cut face of the pack and an inner wall of the battery cell holder.

8. The secondary battery according to claim 1, wherein the bottom face part of the battery cell holder disposed opposite the lid includes one or more engagement concavities configured to receive a removable engagement member to secure the secondary battery when the secondary battery is externally attached to one of the electronic appliance and a battery charger.

9. The secondary battery according to claim 8, wherein the one or more engagement concavities is a single engagement concavity that extends longitudinally across substantially a width of the bottom face part of the battery cell holder.

10. The secondary battery according to claim 8, wherein the one or more engagement concavities includes two concavities on the bottom face part of the battery cell holder, the two concavities being spaced apart from each other symmetrically about a central portion of the bottom face part of the battery cell holder.

11. The secondary battery according to claim 1, wherein a wall thickness of the battery cell holder is approximately 0.3 mm.

12. The secondary battery according to claim 4, wherein the elastic member absorbs impacts to the secondary battery caused by falling and vibration, thereby reducing a load to a joining part of the secondary battery where the positive and negative electrode terminals of the battery cell are joined with positive and negative electrode tabs of the lid, respectively.

13. The secondary battery according to claim 1, wherein the pack of the battery cell includes an accommodating sheet and a sealing sheet that sandwich a battery element, the accommodating sheet and the sealing sheet each including at least an aluminum layer, and
wherein longitudinal sides of the pack are cut faces such that the aluminum layer is exposed along a longitudinal side face of the battery cell.

14. The secondary battery according to claim 1, wherein an outermost perimeter from a first end of the battery cell holder to a second end of the battery cell holder and an outermost perimeter of the lid, are each formed in the substantially trapezoidal shape with respect to the cross section, such that an entire length of the secondary battery is of the substantially trapezoidal shape,
wherein the substantially trapezoidal shape is a substantially flat shape with respect to the cross section thereof such that each adjoining side of the trapezoidal shape includes a first portion that adjoins an upper face of the battery cell holder and a second portion that adjoins a lower face of the battery cell holder, and
wherein the first portion of each adjoining side of the trapezoidal shape has a circular arc shape that extends longitudinally along the entire length of the secondary battery and the second portion of each adjoining side of the trapezoidal shape has a square-shape that extends longitudinally along the entire length of the secondary battery.

15. The secondary battery according to claim 13, wherein a second side face of the battery cell abuts the bottom face part of the battery cell holder, the bottom face part of the battery cell holder being opposite to the opening of the battery cell holder, the second side face being a non-planar surface and being adhered to the bottom face part of the battery cell holder via an elastic member including a pressure-sensitive foam,
wherein the elastic member extends longitudinally along the bottom face part of the battery cell holder, and
wherein an insulating film strip is arranged at each end of the elastic member, each insulating film strip extending from the elastic member on the second side face of the battery cell and wrapping around to cover a longitudinal side face of the battery cell so as to be disposed between the cut face of the pack and an inner wall of the battery cell holder.

16. The secondary battery according to claim 14, wherein a radius of curvature of the first portion of each short side of the trapezoidal shape is substantially greater than a radius of curvature of the second portion of each short side of the trapezoidal shape.

17. A secondary battery for an electronic appliance, comprising:
a battery cell including a positive electrode, a negative electrode, and an electrolyte in a pack, a positive electrode terminal and a negative electrode terminal from the positive electrode and the negative electrode, respectively, being each led out from a first side face of the battery cell;
a battery cell holder including an opening, a bottom face part, and two opposing longitudinal faces, the bottom face part being smaller than both of the opposing longitudinal faces, the battery cell being inserted into the opening, and the battery cell holder accommodating the battery cell therein such that the first side face of the battery cell is faced towards the opening; and
a lid including terminal parts configured to be connected to the positive and negative electrodes upon being connected to the positive electrode terminal and the negative electrode terminal and being faced outwardly, the lid plugging the opening of the battery cell holder,
wherein a cross section of an entirety of the secondary battery has a substantially trapezoidal flat plate shape including a long edge, a short edge that is shorter than the long edge, and opposing adjoining sides, which adjoin the long edge and the short edge, and
wherein the positive electrode terminal and the negative electrode terminal are faced outwardly and are disposed closer to the short edge of the trapezoidal shape than to the long edge, and
wherein the bottom face part of the battery cell holder includes one or more engagement concavities configured to receive a removable engagement member to secure the secondary battery when the secondary battery is externally attached to one of the electronic appliance and a battery charger.

18. The secondary battery according to claim 17, wherein the one or more engagement concavities is a single engagement concavity that extends longitudinally across substantially a width of the bottom face part of the battery cell holder.

19. The secondary battery according to claim 17, wherein the one or more engagement concavities includes two concavities on the bottom face part of the battery cell holder, the two concavities being spaced apart from each other symmetrically about a central portion of the bottom face part of the battery cell holder.

* * * * *